US012045683B2

United States Patent
Cassidy et al.

(10) Patent No.: US 12,045,683 B2
(45) Date of Patent: *Jul. 23, 2024

(54) CHEMICALLY TREATED, RFID EQUIPPED MESH TIRE LABELS AND METHODS OF MAKING AND USING THE SAME FOR IDENTIFICATION AND TRACKING PURPOSES DURING AND POST-TIRE MANUFACTURE

(71) Applicant: FineLine Technologies, Norcross, GA (US)

(72) Inventors: Glenn M. Cassidy, O'Fallon, MO (US); Michael E. Borgna, O'Fallon, MO (US); Jos Uijlenbroek, Ophemert (NL)

(73) Assignee: FINELINE TECHNOLOGIES, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,600

(22) Filed: Jun. 12, 2023

(65) Prior Publication Data
US 2023/0321936 A1    Oct. 12, 2023

Related U.S. Application Data

(63) Continuation of application No. 16/999,575, filed on Aug. 21, 2020, now Pat. No. 11,697,258.
(Continued)

(51) Int. Cl.
*B60C 19/00*    (2006.01)
*G06K 7/10*     (2006.01)
(Continued)

(52) U.S. Cl.
CPC ........ *G06K 19/07764* (2013.01); *B60C 19/00* (2013.01); *G06K 7/10009* (2013.01);
(Continued)

(58) Field of Classification Search
CPC ........ G06K 19/07764; G06K 7/10009; G06K 19/07722; B60C 19/00; B60C 2019/004; B29D 2030/0077
See application file for complete search history.

(56) References Cited

U.S. PATENT DOCUMENTS

| 949,888 A | 2/1910 | Evans |
| 1,561,759 A | 11/1925 | Wetmore |

(Continued)

FOREIGN PATENT DOCUMENTS

| EP | 3522077 A1 * | 8/2019 | ....... G06K 19/07722 |
| JP | 2018114841 A | 7/2018 | |

(Continued)

OTHER PUBLICATIONS

1 International Search Report and Written Opinion for PCT/US2020/047373 mailed Nov. 20, 2020 (9 pages).

*Primary Examiner* — Chico A Foxx
(74) *Attorney, Agent, or Firm* — Shumaker, Loop & Kendrick, LLP

(57) ABSTRACT

A chemically treated, RFID equipped mesh tire label configured to be integrally incorporated within a vulcanized tire and to provide unique identifier(s) and/or other information about the vulcanized tire during and post tire vulcanization, the label comprising:
  a mesh face layer configured to be adhered to an outer surface of an unvulcanized tire;
  a mesh backing layer attached to the mesh face layer and adapted to be integrally incorporated in a vulcanized tire after subjecting a green tire to a vulcanization process; and
  an RFID device affixed between the mesh face and mesh backing layers, the RFID device that is configured to
(Continued)

provide unique identifier(s) and/or other information upon being read with an RFID reader during and post tire vulcanization.

24 Claims, 18 Drawing Sheets

Related U.S. Application Data

(60) Provisional application No. 62/890,339, filed on Aug. 22, 2019.

(51) Int. Cl.
*G06K 19/077* (2006.01)
*B29D 30/00* (2006.01)

(52) U.S. Cl.
CPC ............ *G06K 19/07722* (2013.01); *B29D 2030/0077* (2013.01); *B60C 2019/004* (2013.01)

(56) References Cited

U.S. PATENT DOCUMENTS

| | | | |
|---|---|---|---|
| 2,188,283 A | 1/1940 | Manchester | |
| 2,344,677 A | 3/1944 | Cornell | |
| 3,410,818 A | 11/1968 | Yurcick | |
| 7,752,905 B2 | 7/2010 | Tatara et al. | |
| 7,900,666 B2 | 3/2011 | Bell | |
| 8,157,172 B2 | 4/2012 | Fenkanyn | |
| 9,327,554 B2 * | 5/2016 | Shannon | B29D 30/0681 |
| 10,899,181 B2 | 1/2021 | Dennes et al. | |
| 11,259,443 B1 | 2/2022 | T. Kunasekaran et al. | |
| 2006/0290505 A1 | 12/2006 | Conwell et al. | |
| 2009/0249627 A1 * | 10/2009 | Xiao | B32B 15/18 29/896.2 |
| 2010/0123584 A1 | 5/2010 | Lionetti et al. | |
| 2012/0091209 A1 | 4/2012 | Hotaling et al. | |
| 2014/0150947 A1 * | 6/2014 | Shannon | C08J 7/0427 156/123 |
| 2014/0187697 A1 * | 7/2014 | Cho | C08G 18/7671 524/590 |
| 2014/0205512 A1 | 7/2014 | King et al. | |
| 2014/0311641 A1 | 10/2014 | El-Harak et al. | |
| 2015/0202837 A1 | 7/2015 | Coetzee | |
| 2015/0314542 A1 | 11/2015 | Tucker et al. | |
| 2017/0277992 A1 | 9/2017 | Janko et al. | |
| 2017/0358839 A1 * | 12/2017 | Wu | H01Q 1/2225 |
| 2018/0114107 A1 * | 4/2018 | Verhaeghe | H01Q 1/2208 |
| 2018/0354304 A1 | 12/2018 | Haidet et al. | |
| 2018/0361692 A1 | 12/2018 | Haidet et al. | |
| 2019/0193480 A1 | 6/2019 | Pulford et al. | |
| 2021/0053306 A1 | 2/2021 | Cassidy et al. | |

FOREIGN PATENT DOCUMENTS

| | | | |
|---|---|---|---|
| WO | 2013006562 A1 | 1/2013 | |
| WO | WO-2016053933 A1 * | 4/2016 | ............ B29D 30/72 |
| WO | WO-2017060222 A1 * | 4/2017 | ............ D02G 3/12 |

* cited by examiner

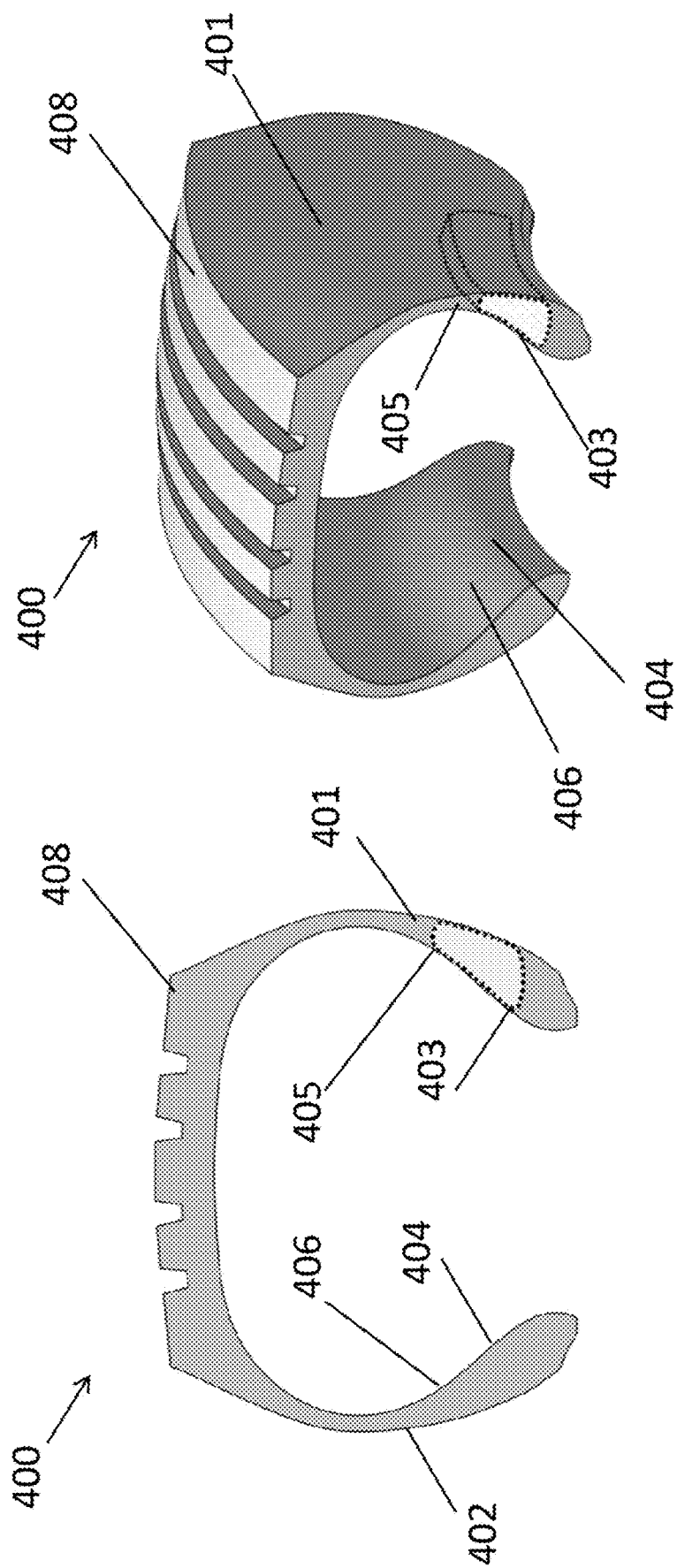

CHEMICALLY TREATED, RFID EQUIPPED MESH TIRE LABELS AND METHODS OF MAKING AND USING THE SAME FOR IDENTIFICATION AND TRACKING PURPOSES DURING AND POST-TIRE MANUFACTURE

TECHNICAL FIELD

The present invention relates generally to mesh labels having barcode and/or radio frequency identification (RFID) capabilities, and more particularly, to chemically treated, RFID equipped mesh labels that can be applied on rubber-based articles (e.g., green tires) prior to vulcanization processes and that can maintain operability during these processes as well as subsequent use of the vulcanized article.

BACKGROUND

Inventory control, quality control, monitoring manufacturing processes, and tracking items throughout the supply chain and during the lifetime of the articles involves providing various identifiers on and/or in the articles of interest at different times during manufacture and post-manufacture of the articles. Typically, labels are applied to articles (e.g., rubber-based articles such as tires) in which the labels contain identifiers and/or other information that can be associated with the article.

When manufacturing rubber-based articles (e.g., manufacturing tires), multiple identification labels are frequently used throughout the manufacturing process. However, labelling rubber-based articles (e.g., tires) can be problematic, particularly if labelling occurs early in the tire manufacturing process prior to, for example, vulcanization, and/or quality tests. For example, during manufacture, green tires (unvulcanised tires) are subjected to harsh vulcanization process(es) in which the tire and/or tire components are molded together to form a vulcanized tire. Vulcanization modifies the rubber-based composition by forming an extensive network of crosslinks within the rubber matrix, thereby significantly increasing the strength and durability of the article (vulcanized article/tire). Although numerous vulcanization techniques utilizing different curing systems (e.g., sulfur curing systems and/or peroxide curing systems) are known, nearly all vulcanization techniques include the application of high pressure and elevated temperatures to the "green," i.e., non-vulcanized, rubber-based article to facilitate vulcanization reactions and processes resulting in the vulcanized article (e.g., vulcanized tire).

In view of the above mentioned process conditions, adhesive-based labels equipped with barcodes and/or RFID devices (e.g., FIGS. 3(a) and 3(b) showing a top view and bottom view of a barcode label 30 having a barcode 31 and an etched RFID antenna 31 embedded therein) have been developed that can be applied to green rubber-based articles such as tires, and some of which can relatively endure the high temperatures and pressures associated with vulcanization. However, these adhesive-based labels have problems. For example, these labels are often applied to the exterior of the tire to maintain operable performance, but due to their exterior placement, these labels have much higher risk of not properly adhering to the tire before, during, and post-vulcanization. In some instances, these labels delaminate either during tire production and/or post-tire production.

In the case of barcoded adhesive labels, barcodes are often damaged during tire manufacture and/or during the tire's lifetime especially when repeatedly exposed to various external forces and elements, thus rendering the barcode unreadable/unidentifiable. These adhesive barcoded labels also disadvantageously suffer from "line of sight" limitations coupled with frequent malfunctions, diminished readability, and/or complete unreadability over time.

To potentially overcome the above mentioned problems, additional RFID devices and labels equipped with these RFID devices have been developed. For example, FIG. 1 depicts one such more robust option with an RFID device 10 having an RFID transponder 11 positioned in the center of the device along with coiled antennas 12, 13 attached to opposite sides of the transponder that extend away therefrom, which are configured to transmit information from the RFID device 10 to an RFID reader.

As shown in FIG. 1, the RFID transponder 11 is a large, rigid rectangular shaped structure and the coiled antennas 12, 13 are also rigid, spring-like structure(s). The RFID device 10 shown in FIG. 1 is configured to be directly embedded into the layers of an unvulcanized tire and to be integrally incorporated within the tire during the vulcanization process (via crosslinking occurring during vulcanization). However, use of the device 10 shown in FIG. 1 is often problematic both during and post-tire manufacture. To evidence this fact, one or both coiled antenna(s) 12, 13 often detach from the RFID device 10 during or post-tire vulcanization, thus rendering the RFID device completely inoperable and not capable of adequately transmitting information to and/or being adequately read by an RFID reader. When this occurs, the RFID device 10 disadvantageously becomes a useless, inoperable foreign body within the tire serving no purpose once one or both antenna(s) 12, 13 detach. Furthermore, the overall shape and rigidity of the RFID device 10 shown in FIG. 1 can lead to microbubble and/or macrobubble formation (and/or micro-warping or delamination) within the tire during vulcanization further weakening overall tire integrity, contributing to quality control issues (e.g., warping and/or de-lamination), and, in certain instances, ultimately leading to discarding of the vulcanized tire due to the quality control issues (associated with the presence of these microbubbles and/or macrobubbles).

In certain aspects and depending on the desired application, the RFID device 10 of FIG. 1 may be encapsulated within a rubber patch 20 as shown, for example, in FIG. 2. However, this patch 20 has numerous limitations. The patch 20 of FIG. 2 is specifically a post-cure (or post-vulcanization) tire tracking solution that, in view of FIGS. 4(a) and 4(b), is applied to the exterior 401, 402 (FIGS. 4a and 4b) or interior sidewall 405, 406 (FIGS. 4a and 4b) of the vulcanized tire 400. Due to its placement, this patch 20 is regularly exposed to the elements (as previously mentioned above) as well as mechanical stress(es) such as flexing and constant tire expansion/contraction, thus resulting in the tire patch 20 of FIG. 2 often exhibiting the same problems as those evidenced with the RFID device 10 of FIG. 1 (i.e., antenna detachment and patch inoperability). Thus, in view of the above problems, a need exists to provide a more robust tire label that overcomes the above mentioned problems.

SUMMARY

Disclosed herein are chemically treated, RFID equipped mesh tire labels that maintain operability during vulcanization and post-vulcanization of a tire. These labels, and more particularly the RFID device positioned therein, retain RFID performance/readability allowing these labels (and RF identifiers associated therewith) to be advantageously utilized throughout the tire manufacturing process, while in the supply chain, and throughout the tire's life. The durability of the RF module included within the RFID device coupled with the dimensional stability of the braided stainless steel antenna assists in maintaining the structural integrity of the entire inlay within the label to avoid degradation of RFID performance during and post-vulcanization of the tire regardless of the many stress(es) encountered.

In addition to the robustness of the RFID device/inlay, the present chemically treated, RFID equipped mesh tire labels are distinguished from prior art by the unique layers and order of materials that make up the entire construct, which further aid in incorporating the labels within the tire during and post-vulcanization. The present labels overcome the shortcomings of prior art and/or prior technologies by having, for example, no line of sight requirements/limitations, multiple tires can be identified simultaneously within field of reading, the label is not visibly seen on the exterior of the tire; asset tracking will occur without concern of human removal/intervention, and/or the survivability of the self-contained RFID module allows the tire or rubber article to be identified at a short read distance even after extreme stress has been exerted on the tire (such as a catastrophic tire failure and the longer read range performance of the RFID antenna has been compromised.

Disclosed herein is a chemically treated, RFID equipped mesh tire label configured to be integrally incorporated within a vulcanized, tire and to provide unique identifier(s) and/or other information about the vulcanized tire during and post tire vulcanization, the label includes a mesh face layer configured to be adhered to an outer surface of an unvulcanized tire; a mesh backing layer attached to the mesh face layer and adapted to be integrally incorporated in a vulcanized tire after subjecting a green tire to a vulcanization process; and an RFID device affixed between the mesh face and mesh backing layers, the RFID device that is configured to provide unique identifier(s) and/or other information upon being read with an RFID reader during and post tire vulcanization.

In certain aspects and during vulcanization, the mesh face layer and mesh backing layers are each configured to pass and disperse green rubber material from an unvulcanized tire therethrough such that the label is integrally bonded within the tire post-vulcanization.

In certain aspects, the mesh face layer and mesh backing layer are configured to homogeneously pass and disperse green rubber material from an unvulcanized tire through and around the label during vulcanization to minimize and/or prevent microbubble and/or macrobubble formation during tire vulcanization.

In certain aspects, at least one of the mesh face and mesh backing layers is chemically treated on its outer surface(s) with a functionalized latex to facilitate bonding (and/or to further minimize and/or prevent microbubble and/or macrobubble formation of the label to a tire during vulcanization.

In certain aspects, both the mesh face and mesh backing layers are chemically treated on its outer surface(s) (i.e., on all outer surfaces) with a functionalized latex to further facilitate bonding of the label to a tire during vulcanization.

In certain aspects, the functionalized latex comprises reactive thiol groups, reactive hydroxyl groups, reactive aldehyde groups, or any combination thereon that facilitate crosslinking between a tire and the mesh face layer and the mesh backing layer during vulcanization to integrally incorporate the label within a vulcanized tire. In certain aspects, the functionalized latex comprises a reactive group(s) that facilitates covalent bonding between a tire and the mesh face layer and the mesh backing layer during vulcanization to integrally incorporate the label within a vulcanized tire.

In certain aspects, the functionalized latex preferably includes reactive aldehydes and is most preferably resorcinol formaldehyde latex.

In certain aspects, the both the mesh face and mesh backing layers are planar and portions of each layer are adhered (e.g., permanently adhered) to one another.

In certain aspects, the mesh face layer comprises an upper surface and a lower surface that are each coated with an adhesive. The adhesive is either transparent or translucent.

In certain aspects, the adhesive on the upper surface of the mesh face layer is configured to adhere the label to a tire outer surface (and/or any desired tire surface) pre-vulcanization and the adhesive on the lower surface of the mesh face layer adheres to the meshing backing layer and affixes the RFID device therein. The adhesive is either transparent or translucent.

In certain aspects, wherein the adhesive is a continuous layer coated/applied on the upper surface of the mesh face layer and on the lower surface of the mesh face layer.

In certain aspects, each adhesive layer/coating ranges from 1.25 thousands of an inch (mils) (0.03175 mm) to 2 mils (0.0508 mm) in thickness and is more preferably 1.45 mils (0.0368 mm) to 1.55 mils (0.03937 mm) in thickness In the most preferred aspects, each adhesive layer/coating is about 1.5 mils (0.0381 mm) in thickness.

In certain aspects, wherein the adhesive disclosed herein preferably includes rubber latex and/or a rosin, more particularly, a rosin ester and/or rosin ester tackifier (e.g., a Snowtack® Tackifier Dispersion/resin) that readily adheres the label(s) to the unvulcanized articles (e.g., tires) disclosed herein.

In certain aspects, the RFID device comprises an RFID module and a flexible, conductive antenna extending from the RFID module. In certain aspects, the conductive antenna is a flexible, metal antenna extending from the RFID module.

In certain aspects, the RFID module is configured with passive UHF capabilities having an integrated circuit with a built-in antenna that can be read with an appropriate RFID reader and continuously maintains operability regardless of whether the flexible, conductive antenna (flexible, metal antenna) remains looped (inductively coupled) around the RF Module during tire vulcanization and/or the life of the tire. For example, the RFID module can preferably be read in the "near field" range of 2 inches (5.08 cm) to 6 inches (15.24 cm) regardless of whether the flexible, conductive antenna (flexible, metal antenna) remains inductively coupled to the RFID module.

In certain aspects, the flexible conductive antenna and/or flexible metal antenna boosts the overall read distance of the mesh labels disclosed herein. In certain aspects, the flexible, conductive antenna(s) and flexible, metal antenna(s) comprises metal yarn(s) or a metal rope wrapped around/inductively coupled to the RFID module, the metal yarn(s) or metal rope having an overall linear length ranging from 3.5 inches (8.89 cm) to 7.5 inches (19.05 cm); 5 inches (12.7 cm) to 7 inches 17.78 cm) and diameter ranging from 0.25 mm to 0.45, and more preferably from 0.29 mm to 0.41 mm. The overall read range of the above mentioned antenna(s) having a linear length/linear confirmation if from 2.5 feet (0.76 m) to 15 feet (4.57 m), from 4 feet (1.21 m) to 12 feet (3.67 m), and from 6 feet (1.82 m) to 10 feet (3.048 m). The read range may be tuned/varied as desired by varying overall antenna length by looping/wrapping/folding the antenna to reduce overall antenna length along the longitudinal axis of the label.

In certain aspects, the flexible conductive antenna(s) and the flexible, metal antenna(s) are configured to be read from 2.5 feet (0.76 m) to 15 feet (4.57 m), from 4 feet (1.21 m) to 12 feet (3.67 m), and from 6 feet (1.82 in) to 10 feet (3.048 m). in the range of 750 to 1050 MHz, and more preferably in the range of 865 to 928 mHz while operatively connected to the RFID module. In certain aspects, the antenna configuration is driven by the tuning requirements of the RE technology used within the disclosed label(s), and the material the antenna will be exposed to (detuned by), for example specific type of rubber, with certain content of carbon black, with additional materials like steel or Kevlar belts. For example a tagging solution for passive UHF RFID on tires will have the antenna optimized for resonance frequency in the 865-928 MHz range after taking into account the detuning effects or specific rubber, carbon, and other materials.

In certain aspects, the flexible, metal antenna is comprised of stainless steel (e.g., braided stainless steel) with a minimum tensile strength of 2.8 kgf load up to 7.25 kgf load, and more preferably with a minimum tensile strength of 5.8 kgf load and up to 7.25 kgf load.

In certain aspects, the chemically treated, RFID equipped mesh tire label further includes a removable liner temporarily adhered to the mesh face layer that is configured for removal upon application of the label to an unvulcanized article (unvulcanized tire).

In certain aspects, the grids within each of mesh face and mesh backing layers are aligned with one another allowing for greater flow and dispersion of green rubber material through and around the label during tire vulcanization and less overall label rigidity than a label having mesh face and mesh backing layers with offset grids.

In certain aspects, grids within each of mesh face and mesh backing layers are offset relative to one another to increase overall label rigidity when compared with a same label having mesh face and mesh backing layers with aligned grids.

Also disclosed herein are methods for forming vulcanized articles (e.g., tire(s)) having the above disclosed chemically treated, RFID equipped mesh label integrally incorporated therein, the method comprises: (a) attaching the chemically treated, RFID equipped mesh label on outer surface of a green tire; (b) placing the green tire with the chemically treated, RFID equipped mesh label attached thereon into a tire mold; (c) subjecting the green tire of step (b) to vulcanization conditions; (d) while vulcanizing the green tire of step (c), passing green rubber material from the green tire through a mesh face layer of the RFID mesh label in a direction towards the mesh backing layer of the RFID mesh label while concurrently migrating the chemically treated, RFID equipped mesh label in an internal direction of the green tire; and (e) concluding vulcanization thereby forming, a vulcanized tire having the chemically treated, RFID equipped mesh label completely embedded and internally positioned (integrated) within the vulcanized tire that is not visible on an outer surface of the tire such that: (i) the chemically treated, RFID equipped mesh label is permanently bonded to internal portions of the vulcanized tire, and (ii) the RFID device within the chemically treated, RFID equipped mesh label can be read from a predetermined distance by a RFID reader.

In certain aspects, the RFID mesh label is integrally incorporated on a tire sidewall or a tire bead.

In certain aspects, also disclosed is a vulcanized tire including the above discussed chemically treated, RFID equipped mesh label integrally incorporated in and completely embedded within the vulcanized tire, the label configured to provide unique identifier(s) and/or other information about the tire.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 4(a) is an exemplary depiction of a tire cross-section showing the portion of the tire inner wall on which an RFID label is affixed to, and FIG. 4(b) is a perspective view of a tire cross-section showing the portion of the tire inner wall on which an RFID label is affixed to;

Figure 13:
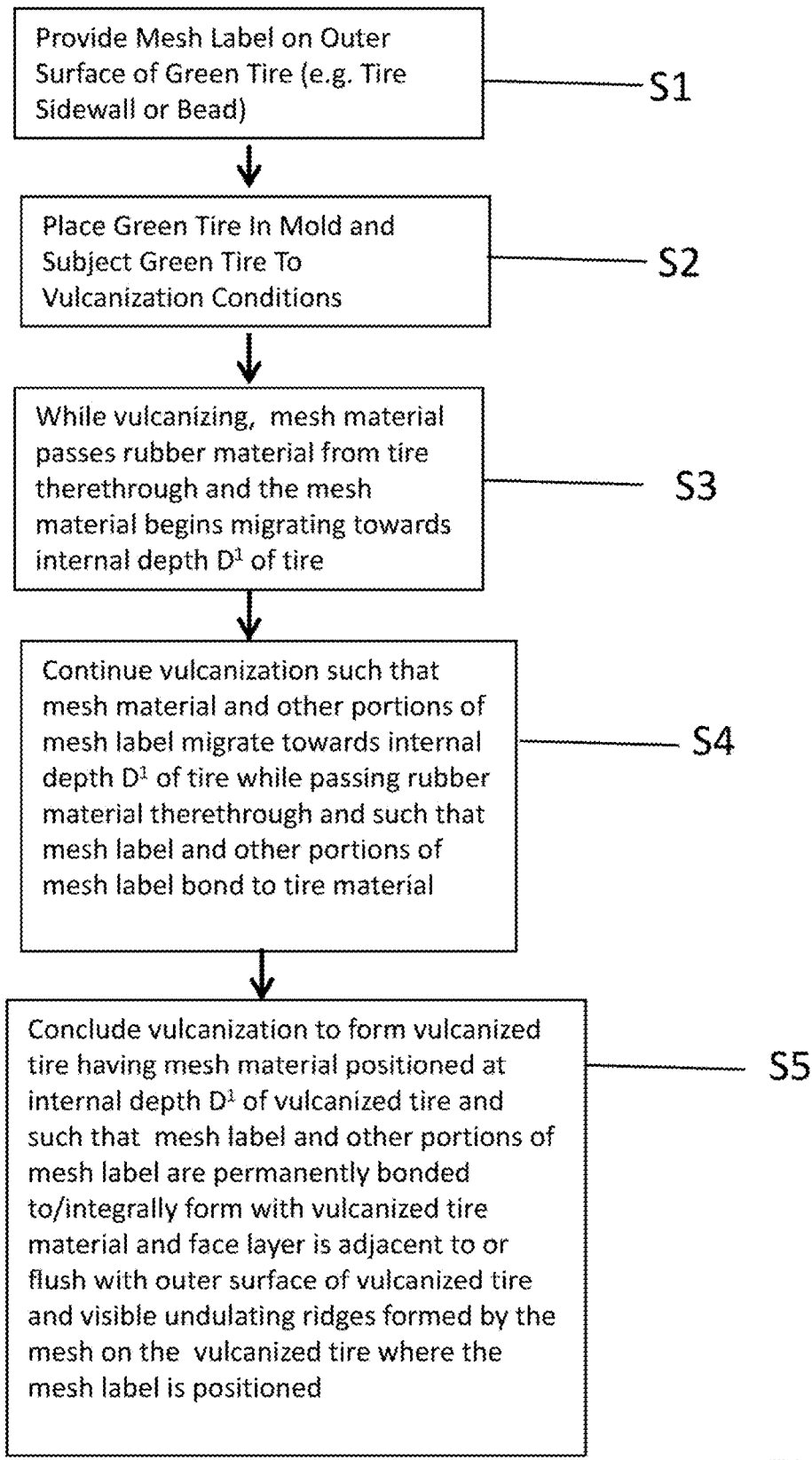
Figure 14B:
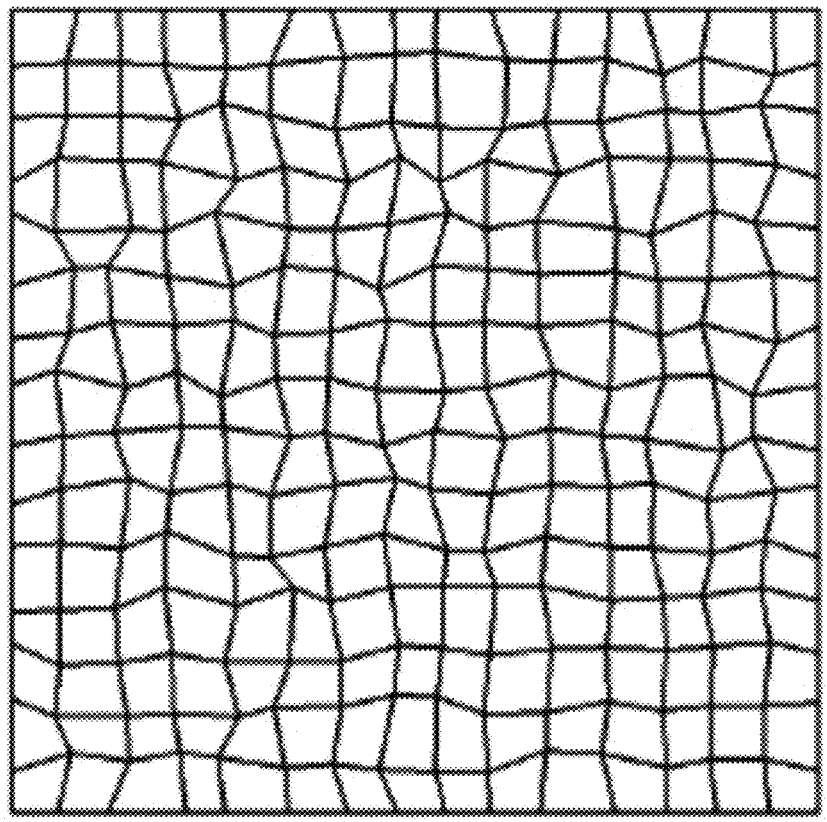
Figure 14A:
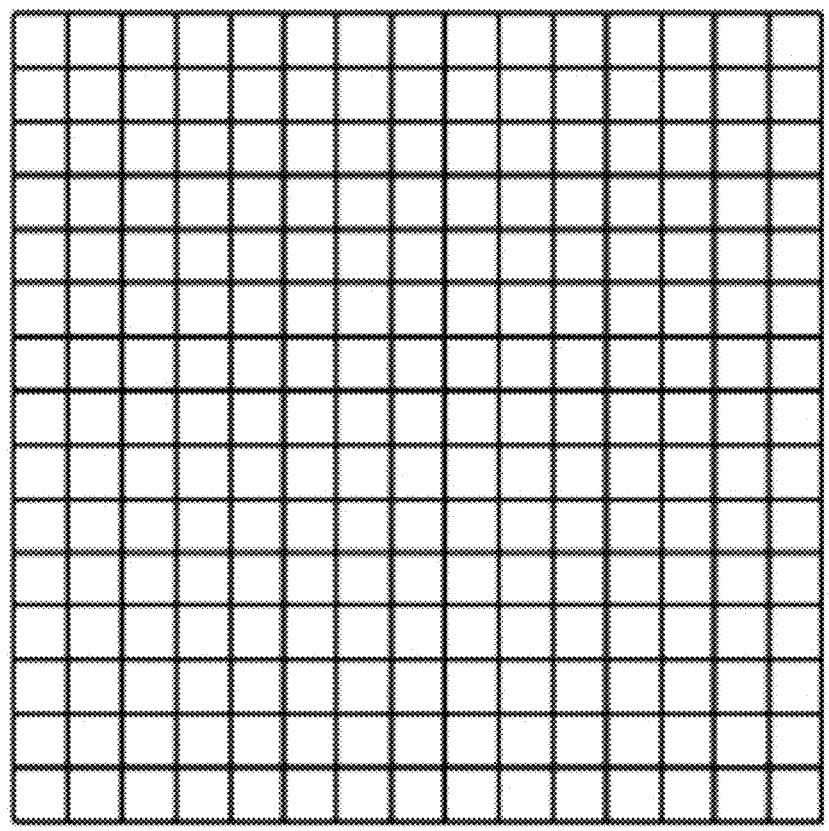

further shows the position of the chemically treated, RFID equipped mesh label within a vulcanized tire;

FIG. 13 depicts steps S1-S5 associated with the method of integrally incorporating/positioning the chemically treated, RFID equipped mesh label(s) disclosed herein within a vulcanized tire; and FIGS. 14(a) and 14(b) schematically depict the mesh face layer and mesh backing layer each having an orthogonal grid and distorted grid pre and post-tire vulcanization respectively.

DETAILED DESCRIPTION

The present invention will now be described more fully hereinafter with reference to the accompanying drawings in which exemplary embodiments of the invention are shown. However, the invention may be embodied in many different forms/articles and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Chemically Treated, RFID Equipped Mesh Label(s) (Overall Construct)

The chemically treated, RFID equipped mesh labels 200 (as shown in FIGS. 5 and 7(a)-11(d)) according to the present invention enable various tire tracking solutions that include electronic identification provisions such as, for example, RFID devices incorporated in the labels are configured to withstand pressures, temperatures and stresses (e.g., mechanical and chemical) associated with manufacturing (e.g., tire vulcanization) and a wide variety of use of tires and other rubber products while concurrently maintaining operability during these processes, after these processes, and throughout the lifetime of the article thereby sensing and providing unique identifier(s) and/or other information about the article during distribution, inventory, and article lifetime.

As disclosed further below, the chemically treated, RFID equipped mesh label are incorporated within the sidewall and/or the bead of a wide array of vulcanized tires. Depending on the type of tire, the stretch of the tire (sidewall) or the use of the tire (e.g. racing tires), the thickness and surface area of the different label materials may vary.

As will be appreciated, tires are typically used in combination with rims of a vehicle. The rubber-based tire provides support and gripping for the vehicle with a road or ground surface. The chemically treated, RFID equipped mesh label may be used with bias tires, belted bias tires, radial tires, solid tires, semi-pneumatic tires, pneumatic tires, airless tires, truck and bus tires, airplane tires, agro tires, racing tires, and/or other rubber articles such as valves, mats, conveyor belts, airsprings, etc.

In certain embodiments the label can withstand conditions typically associated with vulcanization processes without degradation. The term vulcanization as used herein generally refers to heating an unvulcanized article to a temperature greater than 90° C., and up to 200° C., for a predetermined time period, for example, at least 10 minutes up to several hours and further subject the article to high pressures to promote crosslinking within, for example, a rubber matrix to form a vulcanized article.

With specific reference to FIGS. 5-9(b), disclosed herein are chemically treated, RFID equipped mesh tire labels 200 that maintain operability during vulcanization and post-vulcanization of a tire. These labels 200, and more particularly the RFID device 110 positioned therein, retain RFID performance/readability allowing the label to be advantageously utilized, read, and/or identified throughout the tire manufacturing process (e.g., vulcanization), while in the supply chain, and the tire's lifetime. The durability of the RF module 111 (shown in FIG. 6) within the RFID device 110 coupled with the dimensional stability of the flexible, metal antenna 112, 113 assists in maintaining the structural integrity of the entire inlay to avoid degradation of RFID performance in addition to its ability to survive curing/vulcanization temperatures of 150°+ C.

Figure 5:
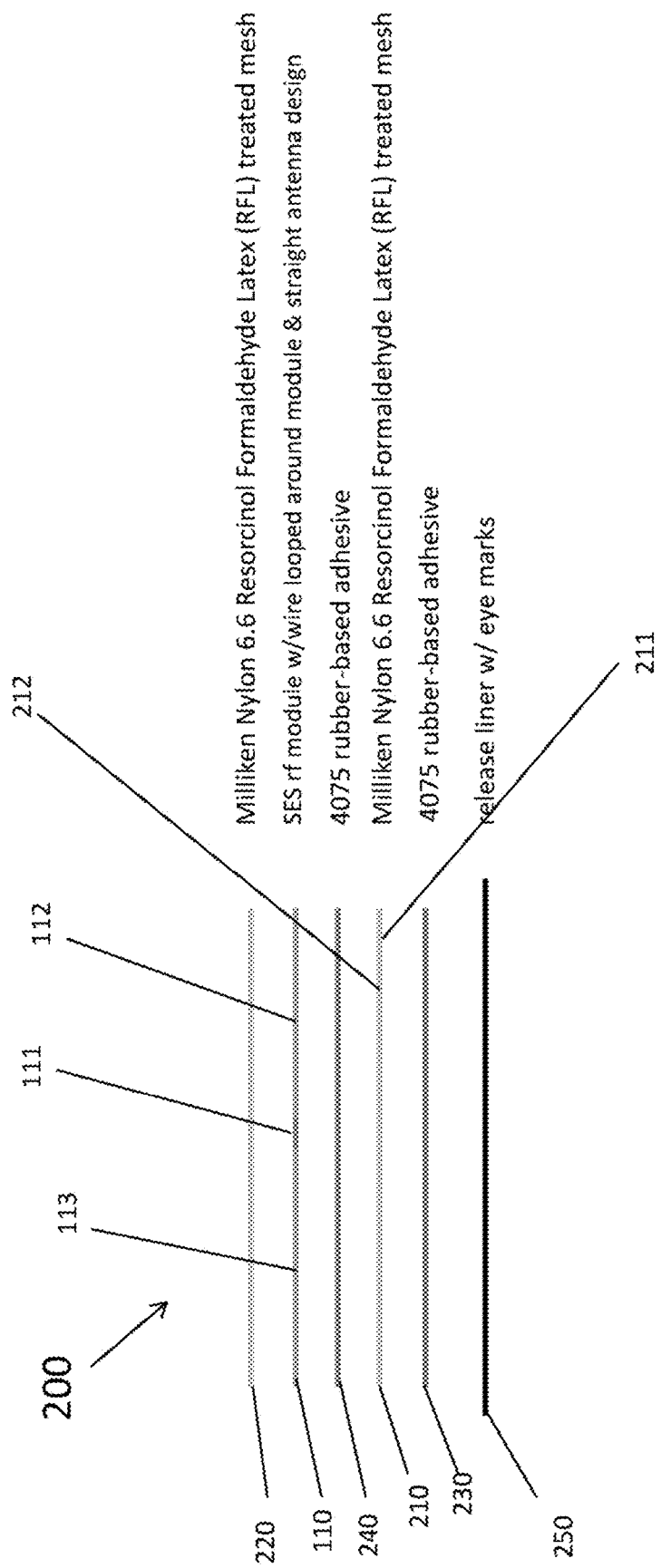
FIG. 5 is an exemplary depiction of the layered stack included within the chemically treated RFID mesh label disclosed herein.

In addition to the robustness of the RFID device/inlay 110, the present chemically treated, RFID equipped mesh tire labels 200 are distinguished from prior art by the layers and order of materials, as shown for example in FIG. 5, that make up the entire label construct. The below discussed labels advantageously overcome the many shortcomings of prior art and/or prior technologies by having, for example, no line of sight requirements/limitations, multiple tires can be identified simultaneously within field of reading, the label is not visibly seen on the exterior of the tire; asset tracking will occur without concern of human removal/intervention, and/or the survivability of the self-contained RFID module allows the tire or rubber article to be identified at a short read distance even after extreme stress has been exerted on the tire (such as a catastrophic tire failure) and the longer read range performance of the RFID antenna has been compromised.

The chemically treated, RFID equipped mesh tire label 200 depicted in FIGS. 5 and 7(a)-12(b) are configured to be integrally incorporated within a vulcanized tire and to provide unique identifier(s) and/or other information about the vulcanized tire during and post tire vulcanization. As shown, for example in FIG. 5, the label 200 includes a mesh face layer 210 configured to be adhered to an outer surface of an unvulcanized tire; a mesh backing layer 220 attached/adhered to the mesh face layer and adapted to be integrally incorporated in a vulcanized tire after subjecting a green tire to a vulcanization process; and an RFID device 110 positioned and securely affixed between the mesh face and mesh backing layers. The RFID device that is configured to provide unique identifier(s) and/or other information associated with the tire, which can read with an RFID reader during and post tire vulcanization when within operable proximity of the label. As further shown in FIGS. 8, 9(a), and 9(b), the chemically treated, RFID equipped mesh tire label 200 further includes a removable liner 250 temporarily adhered to the mesh face layer by an adhesive (discussed further below) that, as shown in FIGS. 9(a) and 9(b), is configured for removal upon application of the label to the desired article (e.g., an unvulcanized tire).

Mesh Face Layer and Mesh Backing Layer

In certain aspects and in view of FIGS. 5, 7(a), 7(b), 9(a) and 9(b), both the mesh face layer 210 and mesh backing layer 220 comprise flexible, orthogonal grids that are semi-deformable during the vulcanization process, but further maintain overall structural integrity of the label 200 during and post-vulcanization of the tire. In view of FIG. 14(b) when compared to FIG. 14(a), the phrase "semi-deformable grid" means maintaining a grid-shaped resemblance post-vulcanization with some warping or deformation of the overall, original orthogonal grid shape structure(s) (shown in FIG. 14(a)) occurring during vulcanization. In general, the mesh face layer 210 and mesh backing layer 220 are somewhat flexible and have slight play in their grid structures to further facilitate complete label integration within the tire during vulcanization and allow for unencumbered passage of unvulcanized material through the label during vulcanization and, unlike the prior art devices of FIG. 1, to further reduce and/or prevent deformations such as microbubble and macrobubble formation from occurring. The grids disclosed herein are included in each of the mesh face layer 210 and mesh backing layer 220 and preferably have a plurality of interconnected square and/or rectangular shape(s) that form the grid with an overall grid density of 15 to 25 squares/rectangles per square centimeter and more preferably 18 to 22 squares/rectangle per square centimeter. When the grid density is above 25 squares/rectangles per square centimeter (in the mesh face layer 210 and mesh backing layer 220), flow of unvulcanized material through the labels disadvantageously becomes encumbered/impeded by the grid(s), thus resulting in microbubble and/or macrobubble formation, microwarping, and/or delamination when a label (having greater than 25 squares/rectangles per square centimeter) is included in a vulcanized tire/during vulcanization. When grid density is less than 15 squares/rectangles per square centimeter (in the mesh face layer 210 and mesh backing layer 220), the overall structural integrity of the label is compromised (e.g., resulting in warping of the mesh layers and/or warping/bending of the disclosed antenna(s) in an undesired manner), thus leading to variable and inconsistent results when the labels having a grid density of less than 15 squares/rectangles per square centimeter are integrated within a tire during and/or post-vulcanization.

In view of FIGS. 5, 7(a), 7(b), 9(a) and 9(b), The mesh face layer 210 and mesh backing layer 220 are each formed from a woven or non-woven material, the woven or non-woven material being formed of a polyamide (e.g., an aliphatic or semi-aromatic polyamide), polyester, polyethylene, polypropylene, or cotton. In certain preferred aspects, mesh face layer 210 and mesh backing layer 220 each are formed of nylon, and in the most preferred aspects, the mesh face layer 210 and mesh backing layer 220 are each formed from nylon 6.6 (e.g., Milliken Nylon 6.6). In the most preferred aspects, mesh face layer 210 and mesh backing layer 220 each are formed of a woven material in which the woven material is nylon 6.6 (e.g., Milliken Nylon 6.6).

To further facilitate integration of the label 200 within a tire during vulcanization, at least one of the mesh face layer 210 and/or mesh backing layer 220 is chemically treated completely on its outer surface(s) with functionalized latex to facilitate bonding of the label to a tire during vulcanization, which may occur by dip coating or spray coating the mesh face layer 210 and/or mesh backing layer 220 within a solution containing the functionalized latex. In certain preferred aspects, both the mesh face 210 and mesh backing 220 layers are chemically treated on its outer surfaces) with functionalized latex to further facilitate bonding of the label to a tire during vulcanization. In certain aspects, the functionalized latex comprises reactive thiol groups, reactive hydroxyl groups, reactive aldehyde groups, or any combination thereon that facilitate crosslinking between a tire and the mesh face layer and the mesh backing layer during vulcanization to integrally incorporate the label within a vulcanized tire. In preferred embodiments, the functionalized latex includes reactive aldehyde groups, and in most preferred embodiments, the functionalized latex is resorcinol formaldehyde latex. The functionalized latex(es) disclosed above are particularly preferred due to the observed overall reduction and/or prevention of deformations (e.g., microbubble and macrobubble formation and/or warping) occurring within a vulcanized tire when using labels 200 having a mesh face layer 210 and/or mesh backing layer 220 coated with functionalized latex(es). Also in view of the above, the functionalized latex comprises a reactive group(s) that facilitates covalent bonding between a tire and the mesh face layer and the mesh backing layer during vulcanization to integrally incorporate the label within a vulcanized tire.

In view of FIGS. 5, 7(a), 7(b), 9(a) and 9(b), both the mesh face layer 210 and mesh backing layer 220 are planar and are adhered to one another at least along their end portions and/or peripheral edges, as well as other portions of each layer 210, 220. For example, as shown in the schematic of FIG. 5, in certain aspects, the mesh face layer 210 comprises an upper surface 211 and a lower surface 212 that are each coated with an adhesive 230, 240. The adhesive coating the upper surface 211 of the mesh face layer 210 is adapted to temporarily adhere to the releasable liner 250 and/or adhere the label 200 to an outer surface of the green tire (unvulcanized tire) during vulcanization while the adhesive coating the lower surface 212 of the mesh face layer 210 preferably permanently bonds/adheres the mesh face layer 210 to a majority of the upper portion(s) of the mesh backing layer 220 and further includes the RFID device permanently securely positioned/adhered therein.

In certain aspects, the adhesive on the upper surface 211 of the mesh face layer 210 is configured to adhere the label to a tire outer surface pre-vulcanization and the adhesive on the lower surface 212 of the mesh face layer adheres to the meshing backing layer 220 and affixes the RFID device 110 therein. The adhesive is either transparent or translucent. The adhesive is a continuous layer/coating 230 coated on the upper surface 211 of the mesh face layer and on the lower surface 212 of the mesh face layer. In certain aspects, each adhesive layer/coating 230, 240 ranges from 1.25 thousands of an inch (mils) (0.03175 mm) to 2 mils (0.0508 mm) in thickness and is more preferably 1.45 mils (0.0368 mm) to 1.55 mils (0.03937 mm) in thickness In the most preferred aspects, each adhesive layer/coating is about 1.5 mils 0.0381 mm) in thickness. When each adhesive layer/coating 230, 240 is less than 1.25 mils, the overall tackifying properties/characteristics of the label are affected, leading to inconsistent adhesion to the releasable liner 250 and/or unvulcanized tire and decreased label structural integrity due to potential detachment/delamination between the mesh face layer 210 and the mesh backing layer 220. When each adhesive layer/coating 230, 240 exceeds 2 mils, structural integrity of the label is also affected due to increased adhesive fluidity and weeping/oozing from the label. In certain aspects, the adhesive disclosed herein preferably includes rubber latex and/or a rosin, more particularly a rosin ester or a rosin ester tackifier (e.g., a Snowtack® Tackifier Dispersion/resin) that readily adheres the label(s) to and maintains the label an the unvulcanized articles (e.g., tires) at least during the initial stages of vulcanization.

During vulcanization, the mesh face layer 210 and mesh backing layer 220 are each configured to pass and disperse green rubber material from an unvulcanized tire therethrough such that the label is integrally bonded within the tire post-vulcanization. In preferred embodiment, the mesh face layer 210 and mesh backing layer 220 are configured to homogeneously pass and disperse green rubber material from an unvulcanized tire through and around the label during vulcanization thereby further minimizing and/or preventing microbubble and/or macrobubble formation during tire vulcanization.

It should be further noted that overall label 200 rigidity may be slightly modified/adjusted by varying grid alignment(s) of the mesh face layer 210 and mesh backing layer 220 relative to one another. Specifically, as shown in, for example, FIG. 7(*a*) and in certain aspects, the grids within each of mesh face 210 and mesh backing 220 layers are aligned (or substantially aligned) with one another allowing for greater flow and dispersion of green rubber material through and around the label 200 during tire vulcanization. The alignment shown in FIG. 7(*a*) results in less overall label rigidity than a label having mesh face and mesh backing layers with offset grids (e.g., shown in FIGS. 7(*b*) and 9(*a*)). However, in view of the above and in certain alternative aspects, a label with increased rigidity is desire, and as shown in, for example, FIGS. 7(*b*) and 9(*a*), grids within each of mesh face 210 and mesh backing 220 layers are offset relative to one another to increase overall label rigidity when compared with a same label having mesh face and mesh backing layers with aligned grids.

RFID Device Incorporated within Chemically Treated, RFID Equipped Mesh Label(s)

Figure 6:
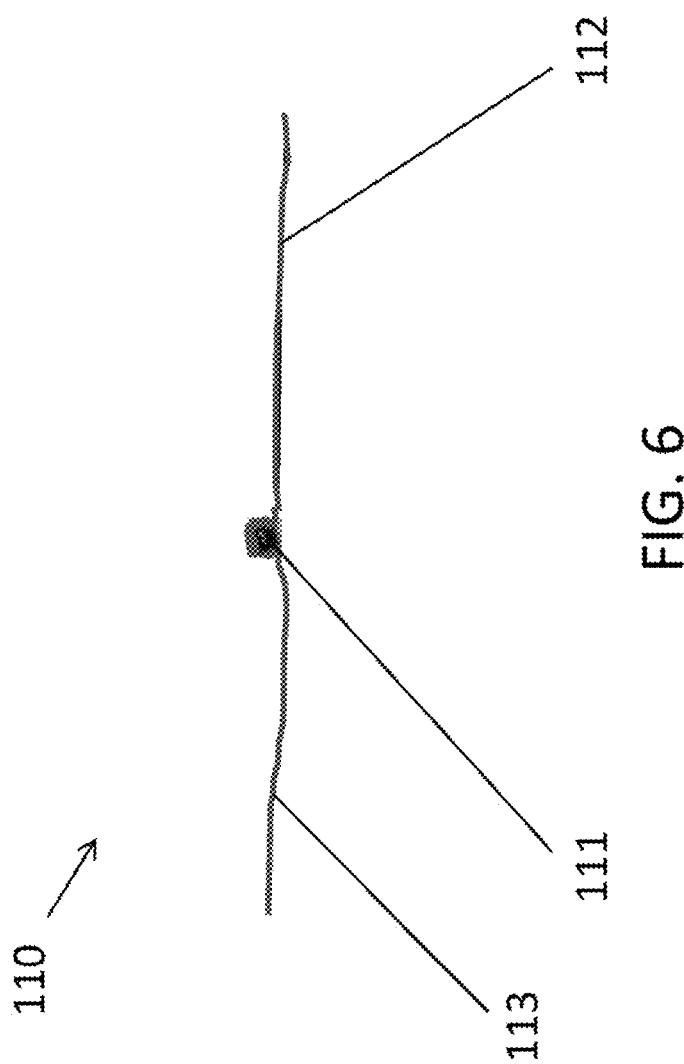
FIG. 6 is an exemplary depiction of the RFID device used within the chemically treated RFID mesh label disclosed herein.

In certain aspects and in view of FIG. 6, the RFID device 110 disclosed herein includes an RFID module 111 and a flexible, conductive antenna (e.g., a flexible, metal antenna) 112, 113 extending away from the RFID module. This RFID device 110 configuration is particularly advantageous in view of conventional RFID devices because the RFID module 111 is configured to continuously maintain operability regardless of whether the flexible, metal antenna remains attached/coupled to or becomes detached/decoupled from the RFID module during tire vulcanization. More specifically, the RFID module is configured with passive UHF capabilities (discussed further below) having an integrated circuit with a built-in antenna that can be read with an appropriate RFID reader and continuously maintain operability regardless of whether the flexible, conductive antenna (flexible, metal antenna) remains looped (inductively coupled) around the RF Module during tire vulcanization or the life of the tire. For example, the RFID module can preferably be read in the "near field" range of 2 inches (5.08 cm) to 6 inches (15.24 cm) regardless of whether the flexible, conductive antenna (flexible, metal antenna) remains inductively coupled to the RFID module.

In certain aspects, the flexible conductive antenna and/or flexible metal antenna 112, 113 boosts the overall read distance of the mesh labels disclosed herein. The flexible, conductive antenna(s) and flexible, metal antenna(s) are wrapped around/inductively coupled to the RFID module and have an overall linear length ranging from 3.5 inches (8.89 cm) to 7.5 inches (19.05 cm); 5 inches (12.7 cm) to 7 inches 17.78 cm) and diameter ranging from 0.25 mm to 0.45, and more preferably from 0.29 mm to 0.41 mm. The overall read range of the above mentioned antenna(s) having a linear length/linear confirmation if from 2.5 feet (0.76 m) to 15 feet (4.57 m), from 4 feet (1.21 m) to 12 feet (3.67 m), and from 6 feet (1.82 m) to 10 feet (3.048 m), but this read range may be tuned/varied as desired by varying overall antenna length and/or looping/wrapping/folding the antenna to reduce overall antenna length along the longitudinal axis of the label. In certain aspects, the flexible conductive antenna and/or flexible metal antenna 112, 113 are formed from metal yarn(s) or metal rope that are configured to be read while operatively connected to the RFID module at the distances discussed immediately above. The RFID module may be, for example, the "Ultra Small Package Tag" manufactured by Hitachi Chemical. In certain aspects, the flexible conductive antenna(s) and the flexible, metal antennas 112, 113 are configured to be read from 2.5 feet (0.76 m) to 15 feet (4.57 m), from 4 feet (1.21 m) to 12 feet (3.67 m), and from 6 feet (1.82 m) to 10 feet (3.048 m) in the range of 750 to 1050 MHz, and more preferably in the range of 865 to 928 mHz while operatively connected to the RFID module. In certain aspects, the antenna configuration is driven by the tuning requirements of the RF technology used within the disclosed label(s), and the material the antenna will be exposed to (detuned by), for example specific type of rubber, with certain content of carbon black, with additional materials like steel or Kevlar belts. For example a tagging solution for passive UHF RFID on tires will have the antenna optimized for resonance frequency in the 865-928 MHz range after taking into account the detuning effects or specific rubber, carbon, and other material(s). The flexible, metal antenna is comprised of stainless steel (and more particularly a braided stainless steel) with a tensile strength ranging from 2.8 kgf load to 7.25 kgf load, and more preferably from 5.8 kgf load to 7.25 kgf load. In certain aspects, the braided stainless steel antenna is a "Type C generation 2 wire" from SES RFID Solutions Gmbh.

In view of the above, conventional RFID devices generally includes an antenna for wirelessly transmitting and/or receiving RF signals and analog and/or digital electronics operatively connected thereto. Commonly, the electronics are implemented via an integrated circuit (IQ or microchip or other suitable electronic circuit and may include, e.g., communications electronics, data memo control logic, etc.

Figure 1:
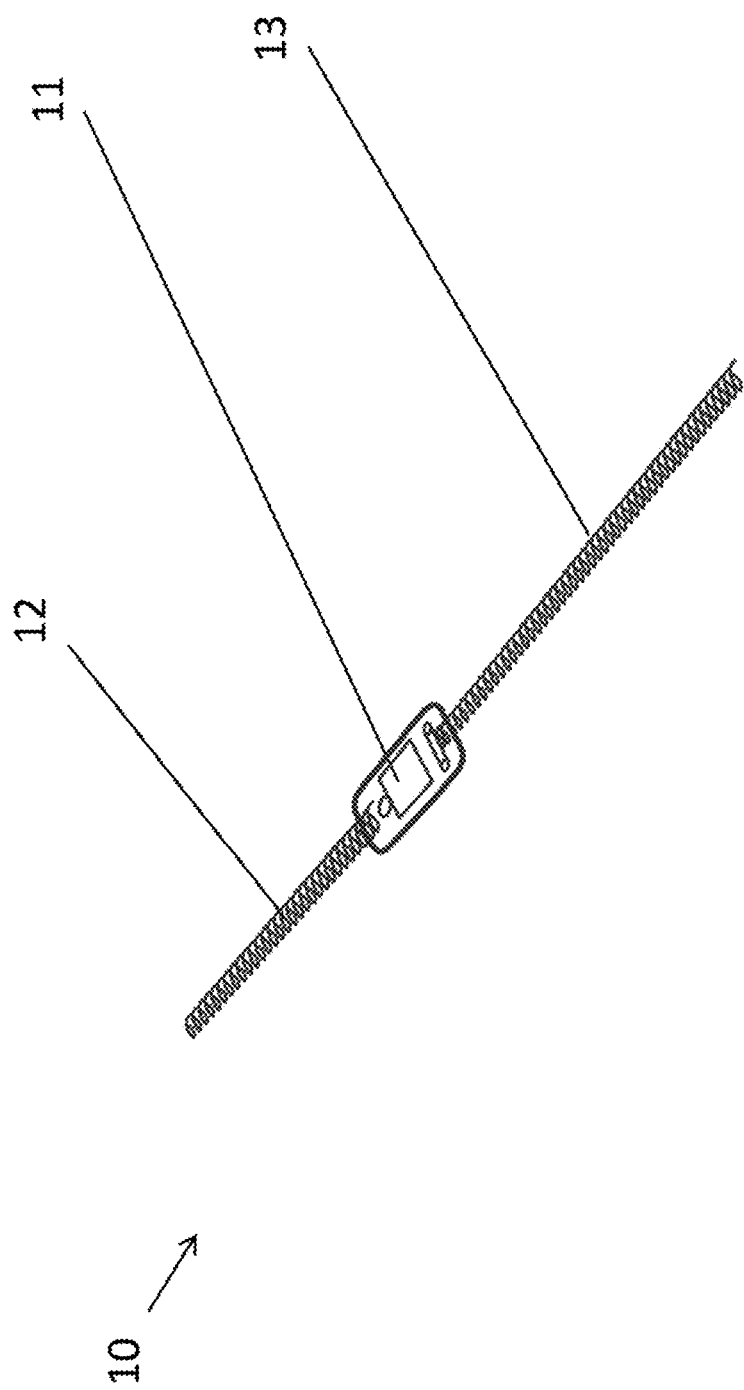
FIG. 1 shows a conventional RFID coil tag device.
Figure 2:
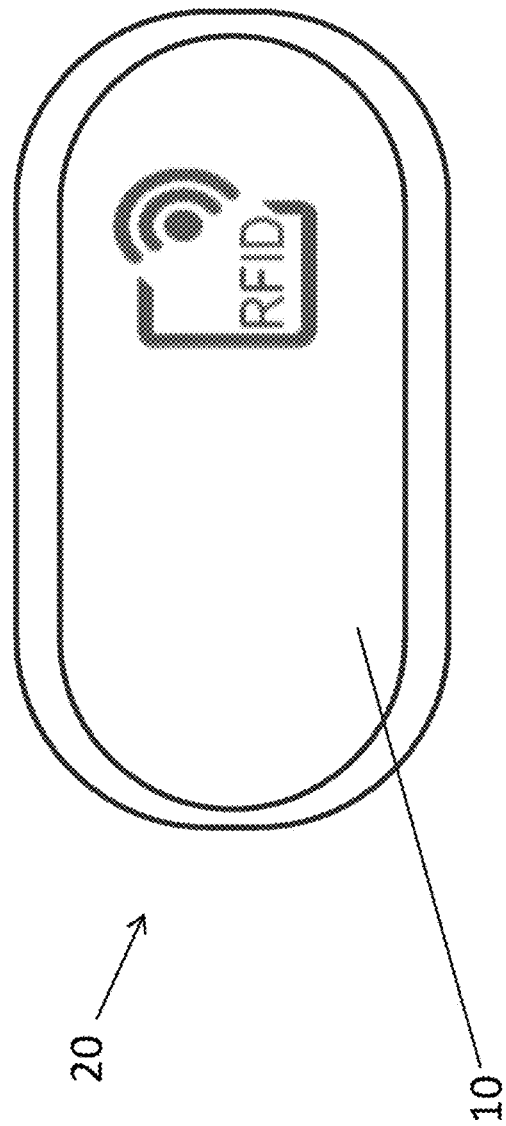
FIG. 2 shows a conventional label including the conventional RFID coil tag device of FIG. 1 therein.
Figure 3B:
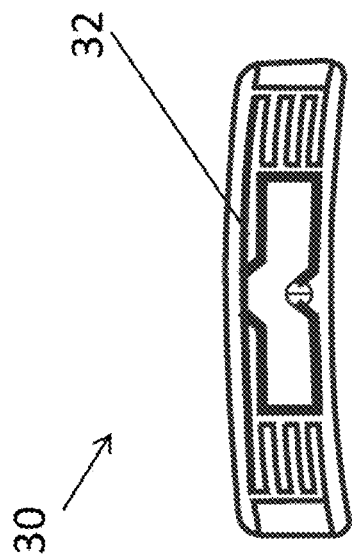
FIG. 3(b) is a bottom view of the conventional RFID equipped bar coded label further showing the etched RFID device included therein.
Figure 3A:
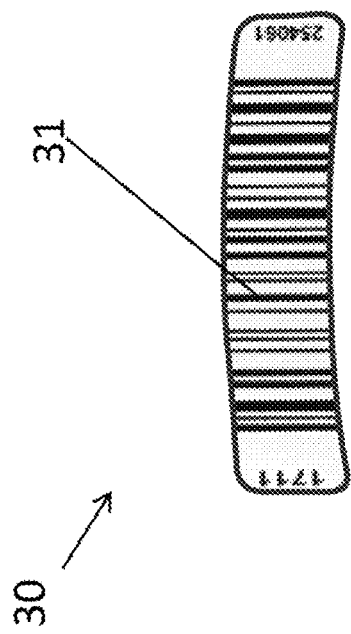
FIG. 3(a) is a top view of a conventional RFID equipped bar coded label.

To further distinguish from conventional devices such as those shown in FIG. 1, the antenna 112, 113 material of RFID device 110 is stainless steel and more preferably comprised of braided stainless steel rather than copper or aluminum etched onto the surface of another material. The braided stainless steel having a tensile strength of 2.8 kgf load. In view of conventional devices, antennas 112, 113 formed of braided stainless steel withstand high temperatures associated with vulcanization and further resists damage from abrasion occurring, for example, during the use of the vulcanized tire. Braided stainless steel huffier has a very high tensile strength and can withstand the constant flexing resulting from constant tire revolution(s) while the tire is in use. Antennas 112, 113 formed of braided stainless steel material have been shown to operably endure even under extreme wheel testing conditions and further do not disassociate from the RFID module 111 when compared to conventional devices such as the RFID device 10 shown in FIG. 1.

Figure 7:
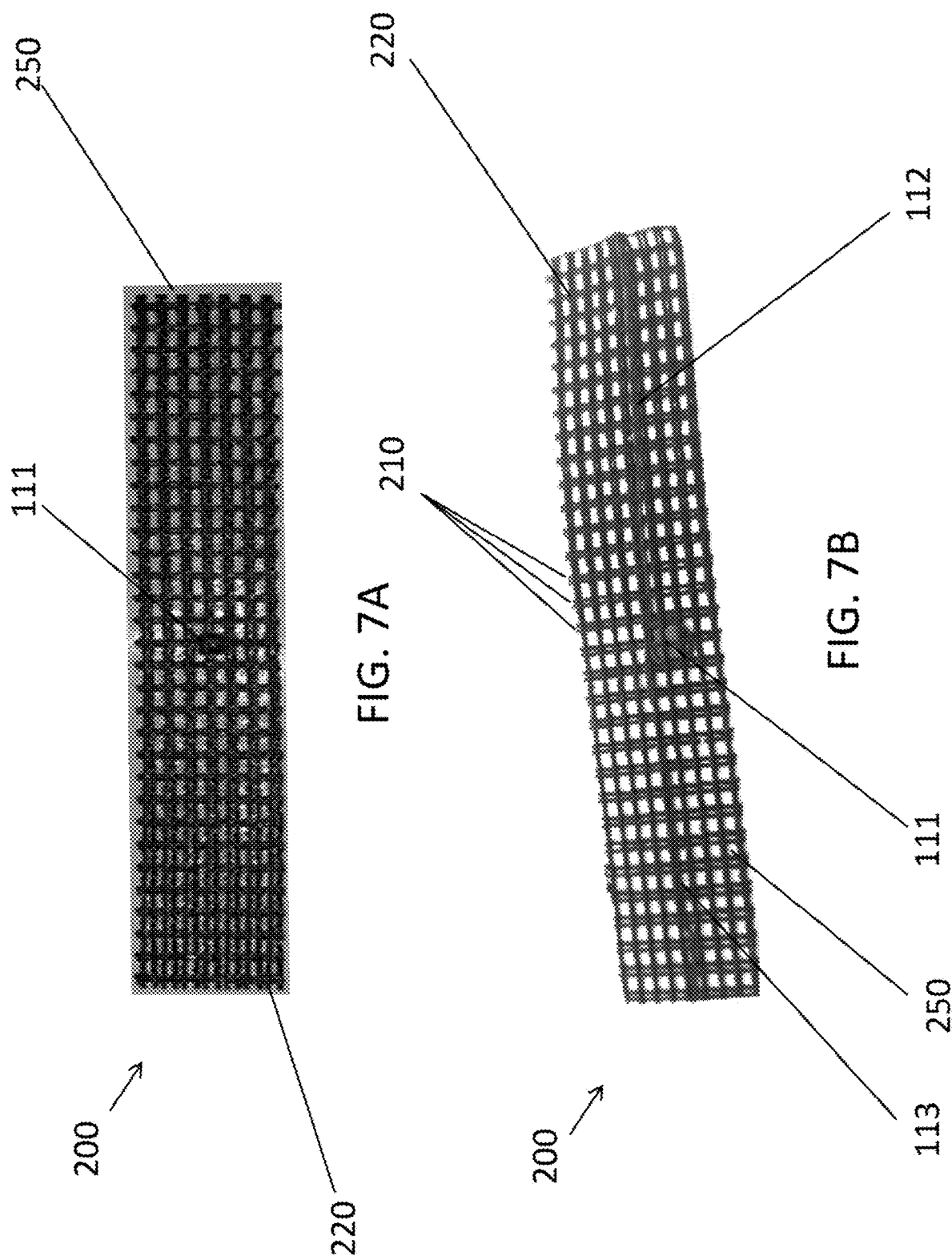
FIG. 7(a) and FIG. 7(b) each show bottom views of the chemically treated RFID mesh label disclosed herein having a releasable liner adhered thereon.
Figure 8:
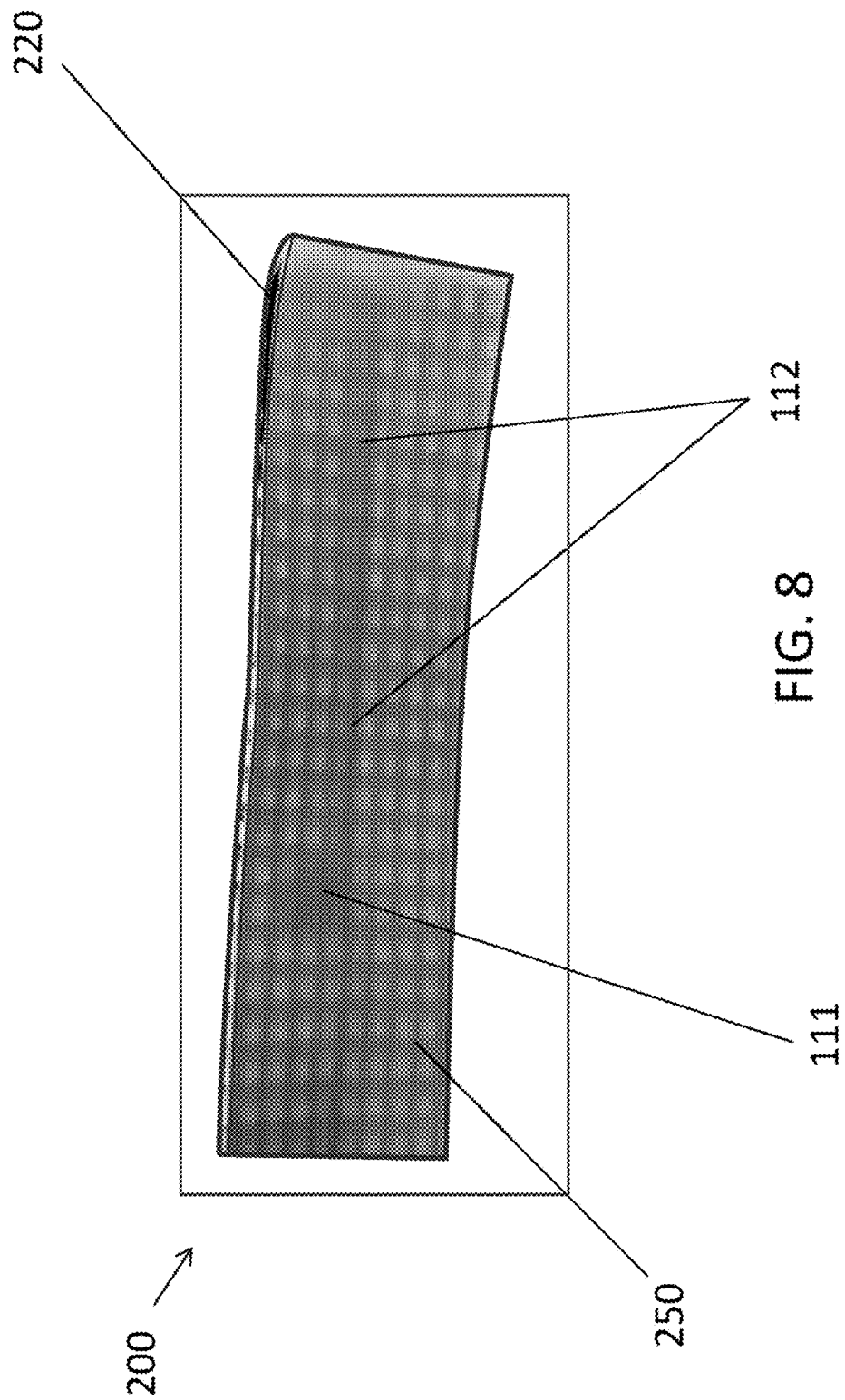
FIG. 8 is top perspective view of the chemically treated RFID mesh label shown in FIGS. 7(a) and 7(b)
Figure 9A:
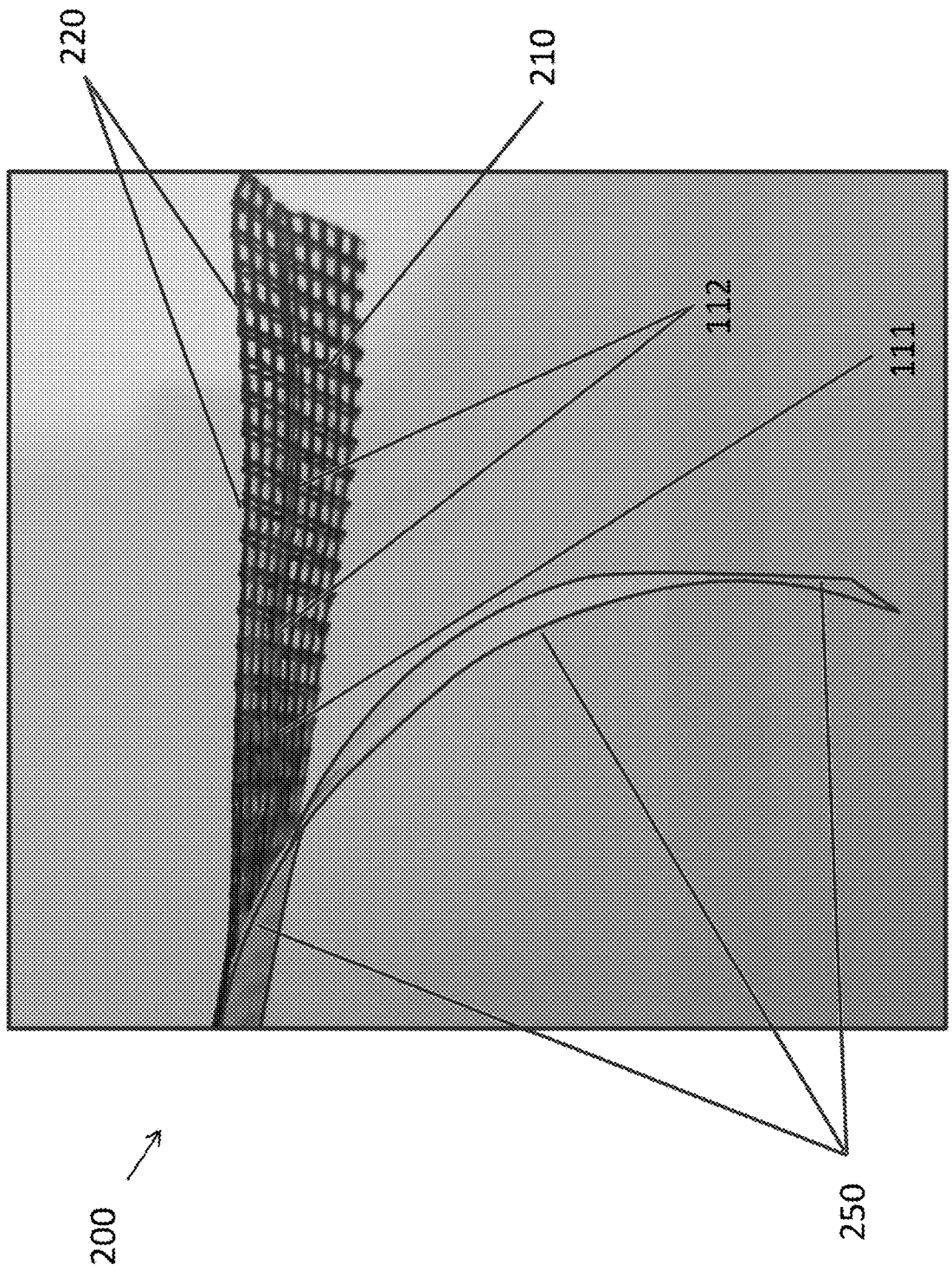
FIG. 9(a) and FIG. 9(b) each show the releasable liner adhered to and being partially removed from the chemically treated RFID mesh label.
Figure 9B:
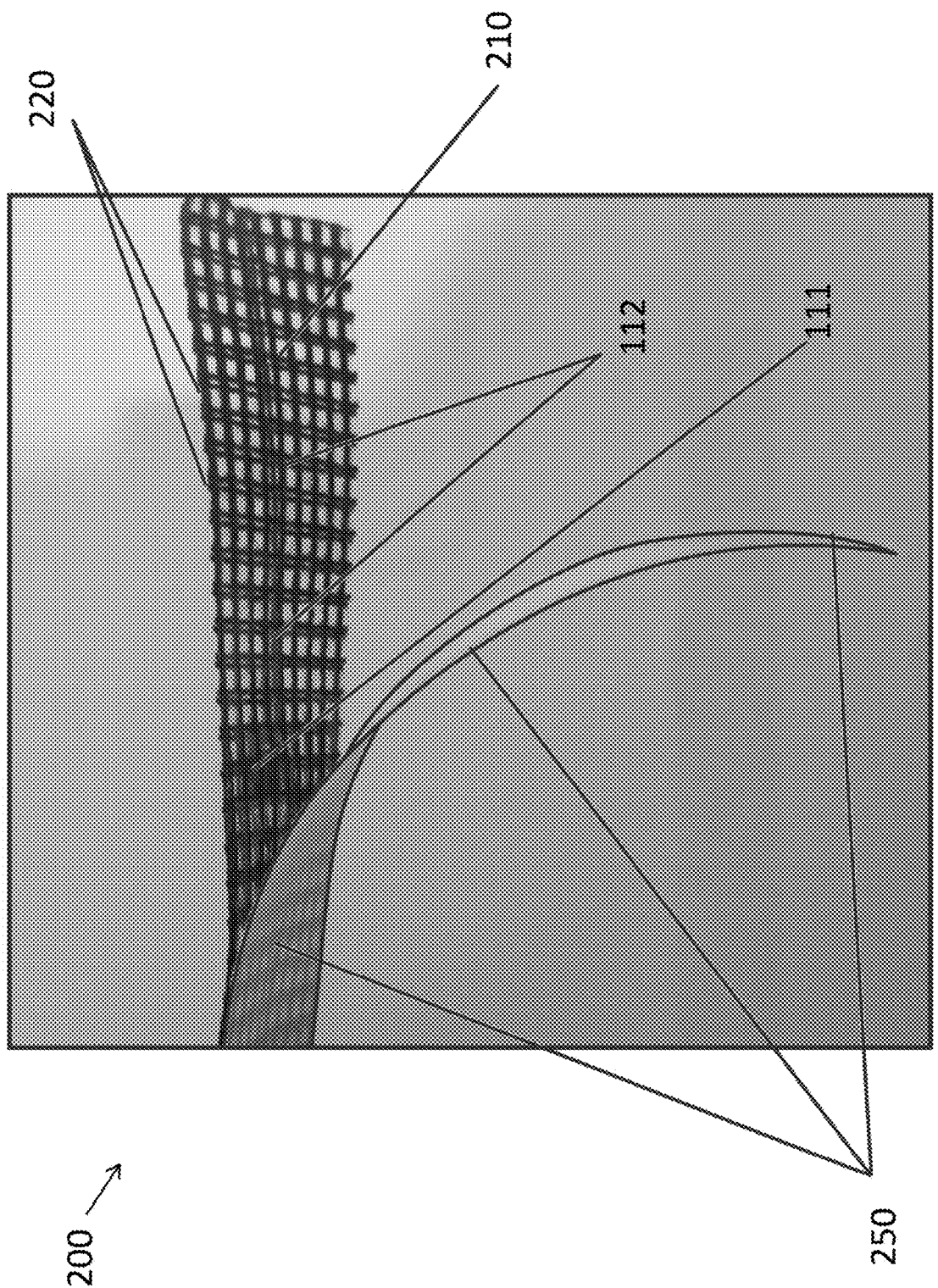
Figure 10:
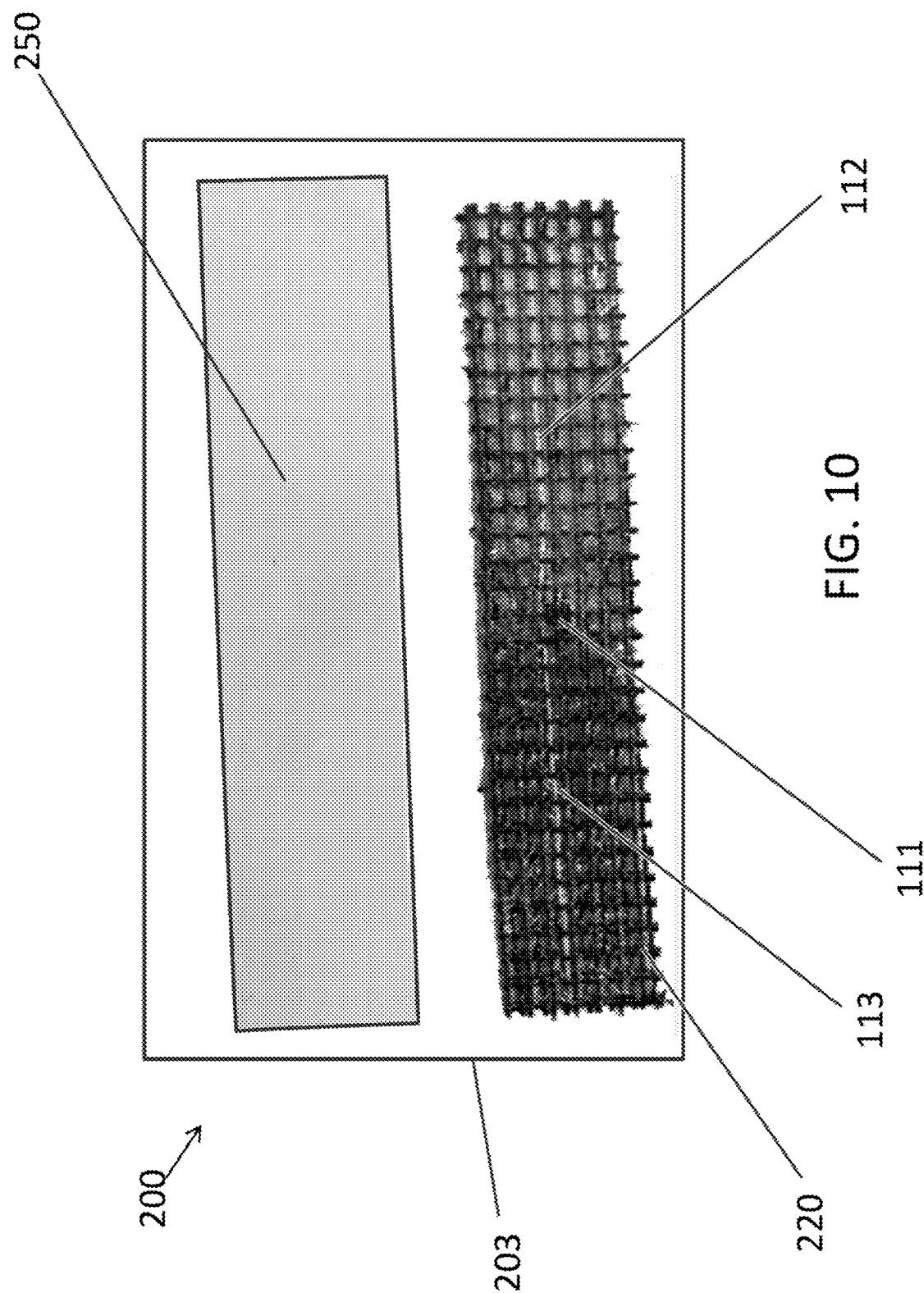
FIG. 10 shows the releasable liner being completely removed from the chemically treated. RFID mesh label with the chemically treated RFID mesh label being adhered to an unvulcanized tire.

Regarding the RFID module 111 depicted in FIGS. 6, 7(*a*), 7(*b*) and 11(*a*)-11(*d*), the RF module is preferably a small, passive ultra-high frequency (UHF) device with its own built-in antenna (i.e., acting as a primary antenna for RFID device 110). The module 111 is a self-contained tan that can be read by an RFID reader at 2 inches (5.08 cm) to 6 inches (15.24 cm) and is manufactured to withstand extremely harsh environments (e.g., vulcanization and constant flexing, expansion, and contract of vulcanized tires). As discussed above, in certain aspects, the antenna 112, 113 braided stainless steel antenna is looped multiple times (inductively coupled) around the module 111 and extends away from the RF module, thereby functioning as a secondary dipole antenna. This overall RFID device 110 configuration has an average read range of 2 meters when the label 200 is incorporated within a vulcanized wheel and further exhibits this read range even after significant road wheel tests. Also, as previously discussed above and if for some reason, the antenna 112, 113, (braided stainless antenna) that 'boosts' the read range performance of the RF module 111 is compromised, the RF module can still be read by an RFID reader (inductive coupling) at a very close distance (as discussed above).

RFID devices often operate in one of a variety of frequency ranges including, e.g., a low frequency (LF) range (i.e., from approximately 30 kHz to approximately, 300 kHz), a high frequency (HF) range (i.e., from approximately 3 MHz to approximately 30 MHz) and an ultra-high frequency (UHF) range (i.e., from approximately 300 MHz to approximately 3 GHz), A passive device will commonly operate in any one of the aforementioned frequency ranges. In particular, for passive devices: LF systems commonly operate at around 124 kHz, 125 kHz or 135 kHz; HF systems commonly operate at around 13.56 MHz; and, UHF systems commonly use a hand anywhere from 860 MHz to 960 MHz. Alternately, some passive device systems also use 2.45 GHz and other areas of the radio spectrum. Active RFID devices typically operate at around 455 MHz, 2.45 GHz, or 5.8 GHz. Often, semi-passive devices use a frequency around 2.4 GHz.

The read range of an RFID device (i.e., the range at which the RFID reader can communicate with the RFID device) is generally determined by many factors, e.g., the type of device (i.e., active, passive, etc.). Typically, passive LF RFID devices (also referred to as LFID or LowFID devices) can usually be read from within approximately 12 inches (0.33 meters); passive HF RFID devices (also referred to as HFID of HighFID devices) can usually be read from up to approximately 3 feet (1 meter); and passive UHF RFID devices (also referred to as UHFID devices) cart be typically read from approximately 10 feet (3.05 meters) or more. One important factor influencing the read range for passive RFID devices is the method used to transmit data from the device to the reader, i.e., the coupling mode between the device and the reader—which can typically be either inductive coupling or radiative/propagation coupling. Passive LFID devices and passive HFID devices commonly use inductive coupling between the device and the reader, whereas passive UHFID devices commonly use radiative or propagation coupling between the device and the reader.

Alternatively, in radiative or propagation coupling application (e.g., as are conventionally used by passive UHFID devices), rather than forming an electromagnetic field between the respective antennas of the reader and device, the reader emits electromagnetic energy which activates or energizes the device. In turn, the device gathers the energy from the reader via its antenna, and the device's IC or microchip uses the gathered energy to change the load on the device antenna and reflect back an altered signal, i.e., backscatter. Commonly, UHFID devices can communicate data in a variety of different ways, e.g., they can increase the amplitude of the reflected wave sent hack to the reader (i.e., amplitude shift keying), shift the reflected wave so it is out of phase received wave (i.e., phase shift keying) or change the frequency of the reflected wave (i.e., frequency shift keying). In any event, the reader picks up the backscattered signal and converts the altered wave into data that is understood by the reader or adjunct computer.

Figure 11A:
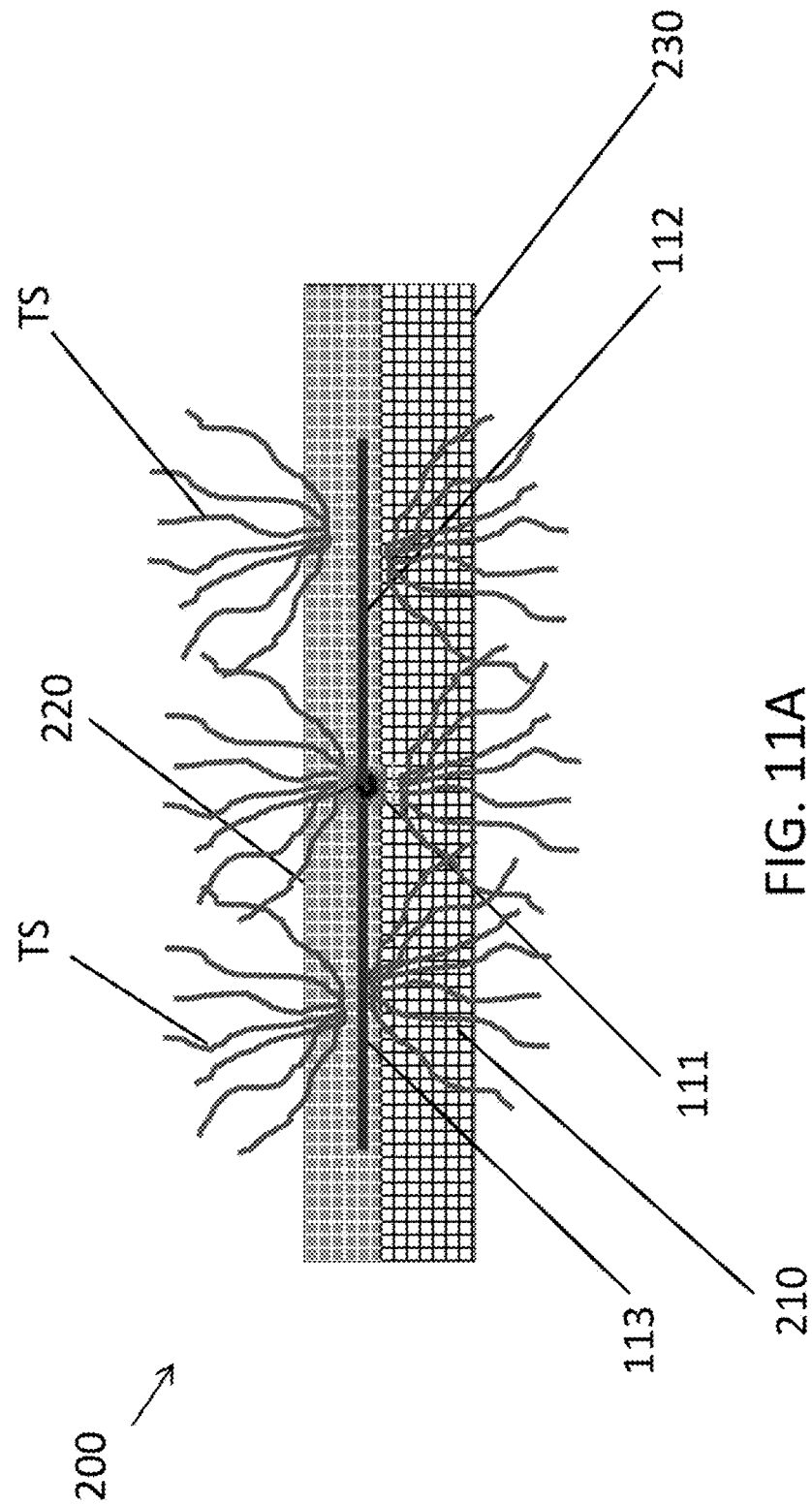
FIGS. 11(a), 11(b), 11(c), and 11(d) sequentially depict the chemically treated, RFID equipped mesh label being provided/attached to a green tire and migrating/descending towards an internal depth ($D^1$) within the tire during vulcanization such that the mesh label is integrally bonded with the vulcanized tire.
Figure 11B:
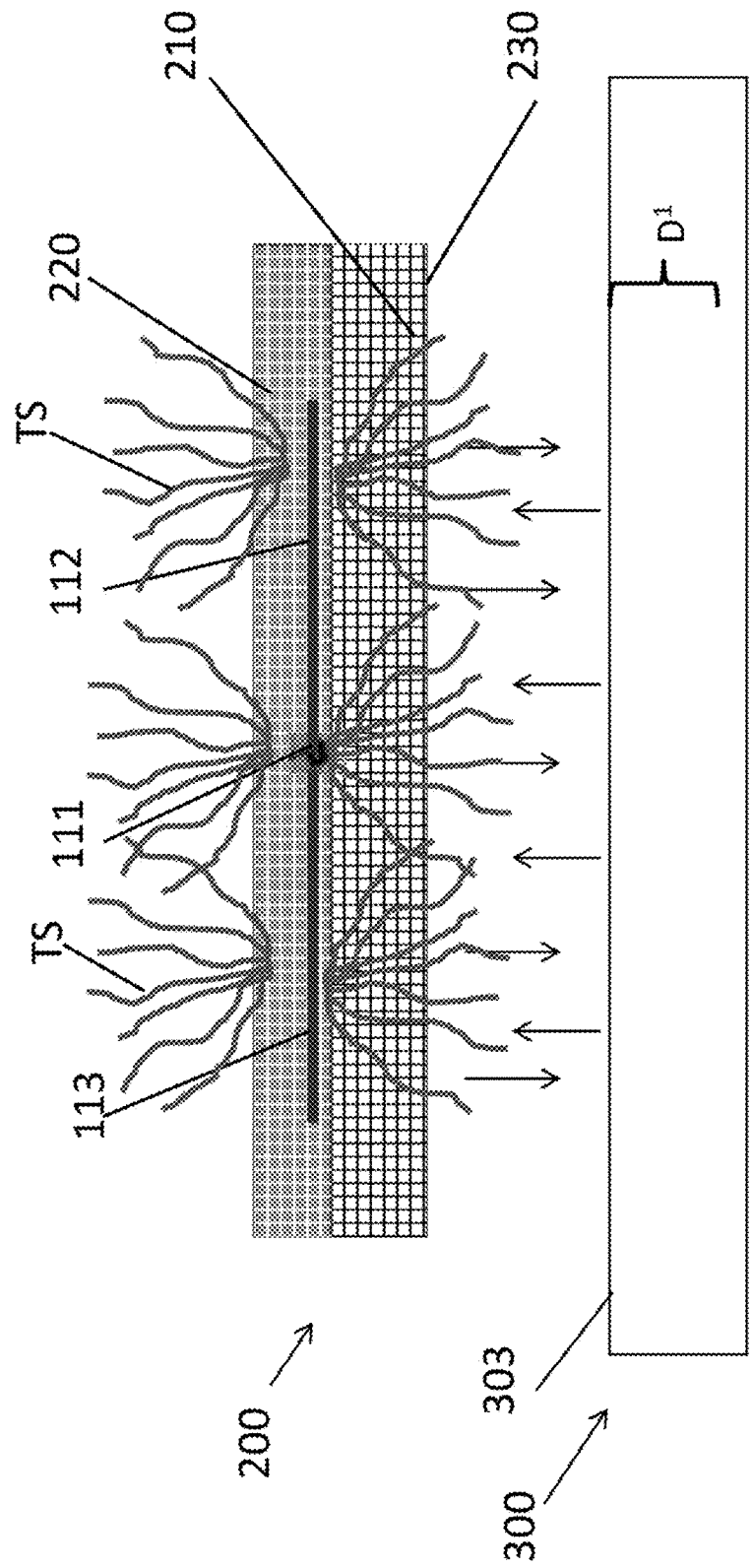
Figure 11C:
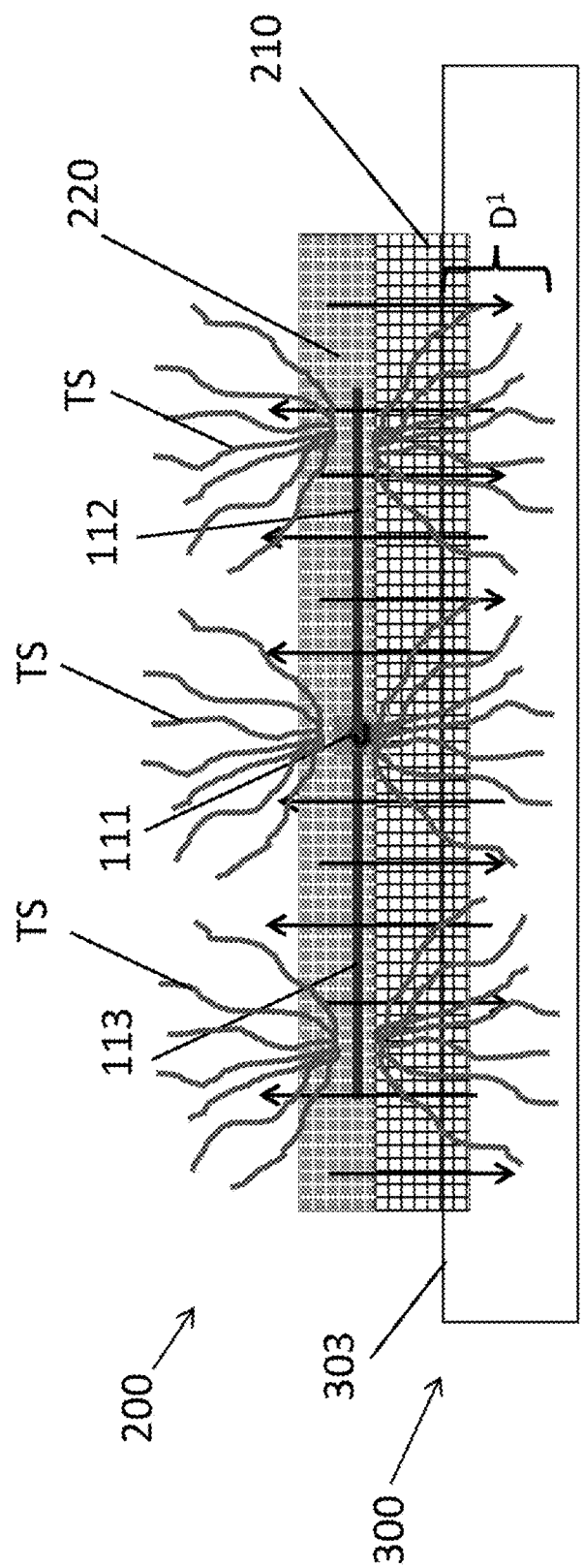
Figure 11D:
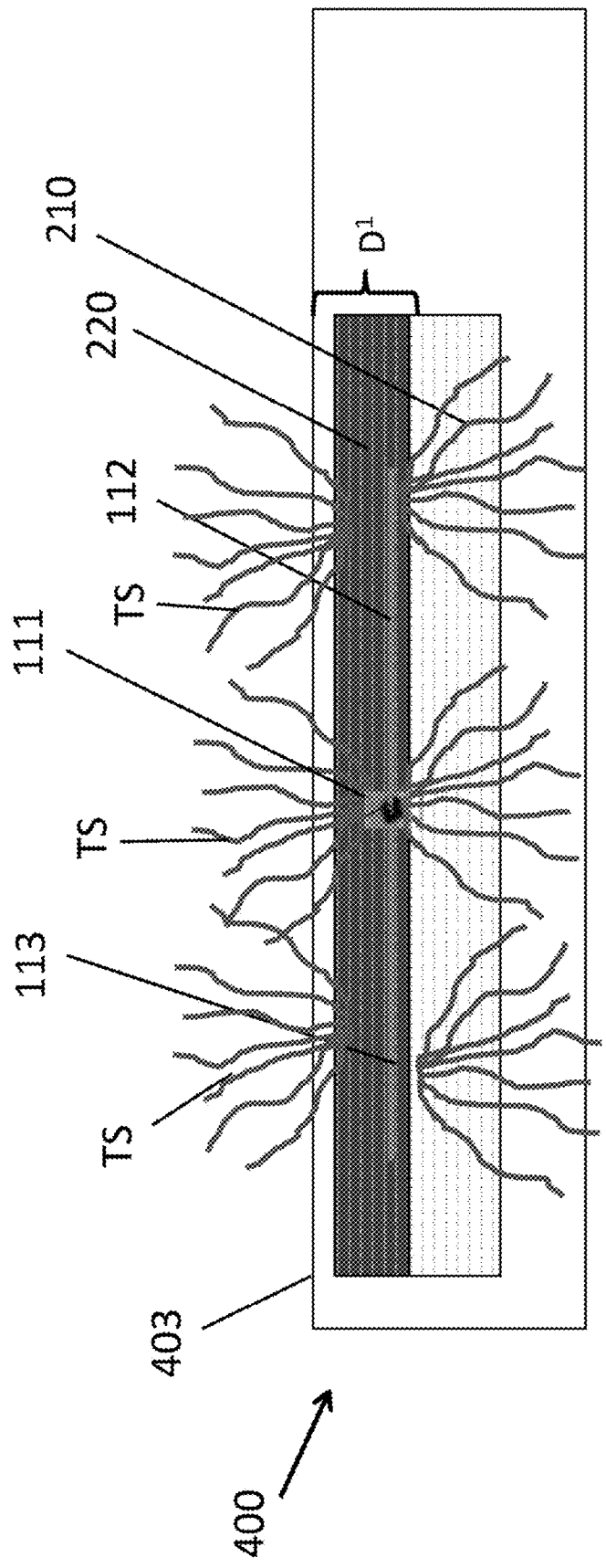
Figure 12A:
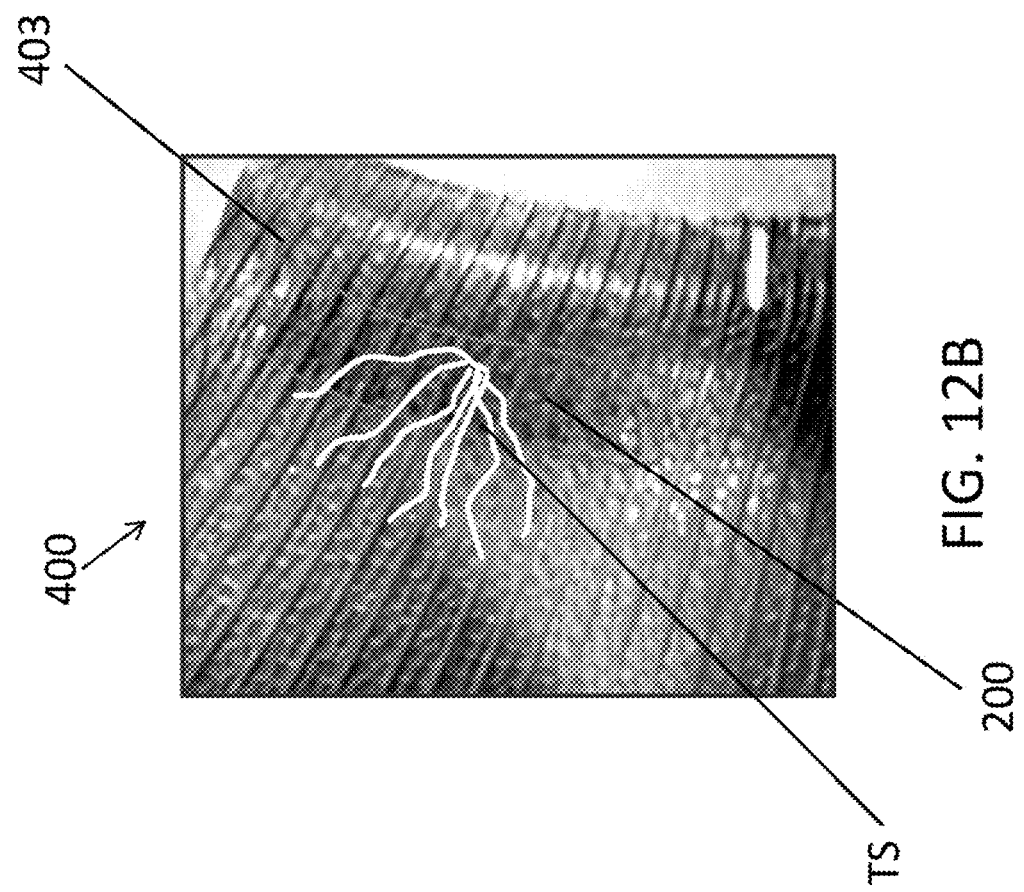
FIG. 12(a) shows the chemically treated RFID mesh label integrally positioned within a vulcanized tire, and FIG. 12(b)
Figure 12B:
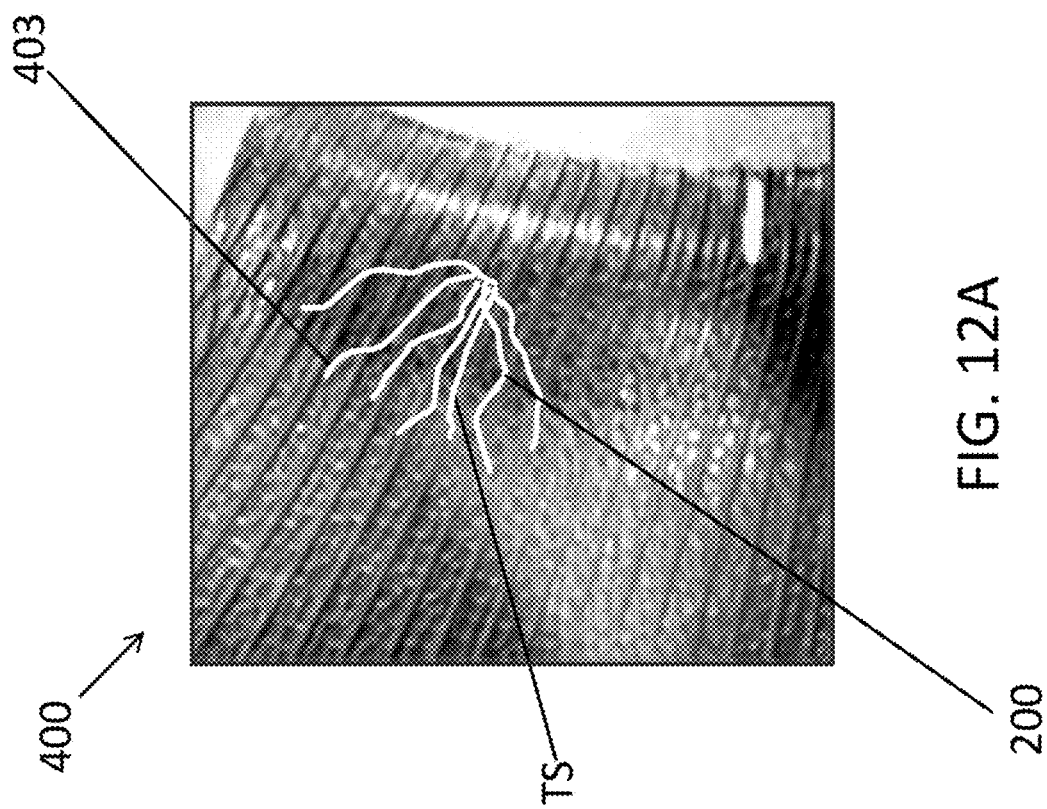

Vulcanized Tire Having the Chemically Treated, RFID Equipped Mesh Tire Label Incorporated Therein and Method of Forming the Same Disclosed herein are vulcanized tires 400 (FIGS. 11(d), 12(a) and 12(b)) having the chemically treated, RFID equipped mesh tire labels 200 incorporated therein as well as methods of forming the same. In particular, FIGS. 11(a)-11(d) sequentially depict the chemically treated, RFID equipped mesh tire label 200 being provided and subsequently attached/adhered to a green/unvulcanized tire 300 (and more particularly to a tire bead 303) and subsequently migrating/descending towards an internal depth ($D^1$) within inner portion(s) of the tire during vulcanization such that the chemically treated, RFID equipped mesh tire label 200 is integrally formed/incorporated within the vulcanized tire 400 (formed from vulcanization of the green tire) during this process, and FIG. 13 further depicts the sequential steps S1-S5 of integrally incorporating/forming the chemically treated, RFID equipped mesh label(s) 200 disclosed herein within a vulcanized tire 400. It should be further noted that "TS" (transmitted signal) along with the lines radiating away from label 200, as shown in FIGS. 11(a)-11(d), 12(a), and 12(b)) are exemplary depictions of a signal transmitted from the RFID module 111 and/or antenna 112, 113, which can be detected/read by an RFID reader.

With specific reference to FIG. 11(a) and step S1 in FIG. 13, the chemically treated, RFID equipped mesh tire label 200 is initially provided. Next, as shown sequentially in FIGS. 11(b) and 11(c), the outer surface of the mesh face layer 210 having adhesive 230 coated thereon is advanced towards and adhered/attached to an outermost surface of a green rubber article/green tire 300 (e.g., bead label of unvulcanized tire 303). The arrows extending downward from the label 200 towards the green tire 300 and arrows extending upward from the green tire 300 indicate the direction(s) in which the label 200 is advanced to adhere/attach the label onto the outermost surface of a green rubber article/green tire 300.

Next and as further detailed in step S2 of FIG. 13 and in view of FIGS. 11(b) and 11(c), the green tire 300 having the label 200 adhered/attached thereto is placed into a tire mold for subsequent vulcanization in which the green tire 300 and mesh label 200 are subjected to temperatures and pressures associated with vulcanization processes to vulcanize the green tire while in the mold.

When initially subjected to temperatures and pressures associated with vulcanization processes while vulcanizing the green tire 300 and as further shown in FIG. 11(c), the mesh label 200 advances in a direction towards an inner portion of the green tire 300. As further shown in FIG. 11(c) in further view of step S3 in FIG. 13, while vulcanizing the green tire 300, the mesh face layer 210 passes green rubber material from the green tire 300 therethrough (indicated as arrows extending upward in a direction extending from inside/inner portions the green tire 300 towards the mesh backing layer 220) such that the entire label 200 (i.e., mesh face layer 210, mesh backing layer 220, and RFID device 110) concurrently migrates/descends towards internal depth $D^1$ of an inner portion of the green tire 300.

In view of steps S4 and S5 of FIG. 13 and FIGS. 11(c)-11(d), vulcanization is continued for a predetermined time period such that the entire chemically treated, RFID equipped mesh label 200 continues to migrate/descend towards internal depth $D^1$ of tire while passing rubber material therethrough such that the mesh face layer 210, mesh backing layer 220, and the RFID device 110 positioned there between bond (e.g., crosslink) to the tire during vulcanization. With specific reference to step S5 of FIG. 13 and in further view of FIG. 11(d), vulcanization is subsequently concluded thereby forming the vulcanized tire 400 having the entire label 200 embedded therein and positioned at an internal depth $D^1$ completely within an inner portion of the vulcanized tire 400 and such that the mesh label 200 is permanently bonded to/integrally incorporated in the vulcanized tire 400. As further shown in FIGS. 11(d), 12(a) and 12(b), because the label 200 is completely embedded within the vulcanized tire 400, the label 400 is not readily visible when one views the vulcanized tire 400 but is instead completely concealed within the vulcanized tire 400 by vulcanized rubber in certain aspects and instead of steps S3-S4 (i.e., mesh label descending to a specific inner depth of the green tire) as shown in FIG. 13, the mesh label 200 remains at and/or near the surface of an outer surface of the tire (e.g., tire inner wall). The mesh face layer 210 and mesh backing layer 220 facilitates the rubber flow and allows, for example, the sulfur atoms (and/or thiol groups) to crosslink the natural rubber through and around the label versus the mesh passing down through the natural rubber.

It should be further noted that in certain aspects, the labels 200 disclosed herein may be included in vulcanized articles as well. For example, the labels can also be positioned in and/or on a retread truck tire and operate in substantially the same manner as discussed above.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A chemically treated, RFID equipped mesh tire label configured to be integrally incorporated within a vulcanized tire and to provide unique identifier(s) and other information about the vulcanized tire during and post tire vulcanization, the label comprising:
   a mesh face layer configured to be adhered to an outer surface of an unvulcanized tire;
   a mesh backing layer attached to the mesh face layer and adapted to be integrally incorporated in a vulcanized tire after subjecting a green tire to a vulcanization process; and
   an RFID device affixed between the mesh face and mesh backing layers, the RFID device that is configured to provide unique identifier(s) and other information upon being read with an RFID reader during and post tire vulcanization,
   wherein: the mesh face layer and mesh backing layer are configured to homogeneously pass and disperse green rubber material from an unvulcanized tire through and around the label during vulcanization to minimize, prevent microbubble and/or macrobubble formation and/or delamination during tire vulcanization, or to minimize, prevent microbubble and macrobubble formation and/or delamination during tire vulcanization.

2. The chemically treated, RFID equipped mesh tire label of claim 1, wherein, during vulcanization, the mesh face layer and mesh backing layers are each configured to pass and disperse green rubber material from an unvulcanized tire therethrough such that the label is bonded within the tire post-vulcanization.

3. The chemically treated, RFID equipped mesh tire label of claim 1, wherein at least one of the mesh face and mesh backing layers is chemically treated on its outer surface(s) with a functionalized latex to facilitate bonding of the label to a tire during vulcanization.

4. The chemically treated, RFID equipped mesh tire label of claim 1, wherein both the mesh face and mesh backing layers are chemically treated on its outer surface(s) with a functionalized latex to further facilitate bonding of the label to a tire during vulcanization.

5. The chemically treated, RFID equipped mesh tire label of claim 4, wherein the functionalized latex comprises reactive thiol groups, reactive hydroxyl groups, reactive aldehyde groups, or any combination thereon that facilitate crosslinking between a tire and the mesh face layer and the mesh backing layer during vulcanization to integrally incorporate the label within a vulcanized tire.

6. The chemically treated, RFID equipped mesh tire label of claim 5, wherein the functionalized latex is resorcinol formaldehyde latex.

7. The chemically treated, RFID equipped mesh tire label of claim 4, wherein the functionalized latex comprises a reactive group that facilitates covalent bonding between a tire and the mesh face layer and the mesh backing layer during vulcanization to integrally incorporate the label within a vulcanized tire.

8. The chemically treated, RFID equipped mesh tire label of claim 1, wherein the both the mesh face and mesh backing layers are planar and are adhered to one another.

9. The chemically treated, RFID equipped mesh tire label of claim 1, wherein the mesh face layer comprises an upper surface and a lower surface that are each coated with an adhesive.

10. The chemically treated, RFID equipped mesh tire label of claim 9, wherein the adhesive on the upper surface of the mesh face layer is configured to adhere the label to a tire outer surface pre-vulcanization and the adhesive on the lower surface of the mesh face layer adheres to the meshing backing layer and affixes the RFID device therein.

11. The chemically treated, RFID equipped mesh tire label of claim 10, wherein the adhesive is a continuous layer on the upper surface of the mesh face layer and on the lower surface of the mesh face layer.

12. The chemically treated, RFID equipped mesh tire label of claim 11, wherein each continuous layer is 1.25 thousands of an inch (mils) to 2 mils in thickness on the mesh face layer.

13. The chemically treated, RFID equipped mesh tire label of claim 9, wherein the adhesive is a rubber latex adhesive.

14. The chemically treated, RFID equipped mesh tire label of claim 1, wherein the RFID device comprises and RFID module and a flexible, metal antenna extending from the RFID module.

15. The chemically treated, RFID equipped mesh tire label of claim 14, wherein the RFID module has passive UHF capabilities with an integrated circuit with a built-in antenna that can be read with an RFID reader and the RFID module is configured to maintain operability regardless of whether the flexible, metal antenna remains attached to or becomes detached from the RFID module during tire vulcanization.

16. The chemically treated, RFID equipped mesh tire label of claim 14, wherein the flexible, metal antenna comprises metal yarn(s) or a metal rope wrapped around and operatively connected to the RFID module.

17. The chemically treated, RFID equipped mesh tire label of claim 16, wherein the flexible, metal antenna is comprised of stainless steel.

18. The chemically treated, RFID equipped mesh tire label of claim 14, wherein the flexible, metal antenna is configured to transmit or be read at a distance of from 2.5 feet to 15 feet while operatively connected to the RFID module.

19. The chemically treated, RFID equipped mesh tire label of claim 1, further comprising a removable liner temporarily adhered to the mesh face layer that is configured for removal upon application of the label.

20. The chemically treated, RFID equipped mesh tire label of claim 1, wherein grids within each of mesh face and mesh backing layers are aligned with one another allowing for greater through and dispersion of green rubber material through and around the label during tire vulcanization and less overall label rigidity than a label having mesh face and mesh backing layers with offset grids.

21. The chemically treated, RFID equipped mesh tire label of claim 1, wherein grids within each of mesh face and mesh backing layers are offset relative to one another to increase overall label rigidity when compared with a same label having mesh face and mesh backing layers with aligned grids.

22. A method for forming vulcanized tire(s) having a chemically treated, RFID equipped mesh label integrally incorporated therein, the chemical treated RFID equipped mesh label comprising:
a mesh face layer configured to be adhered to an outer surface of an unvulcanized green tire;
a mesh backing layer attached to the mesh face layer and adapted to be integrally incorporated in the green tire after subjecting the green tire to a vulcanization process; and
an RFID device affixed between the mesh face and mesh backing layers, the RFID device is configured to provide unique identifier(s) and other information upon being read with an RFID reader during and post tire vulcanization;
wherein:
the mesh face layer and mesh backing layer are configured to homogeneously pass and disperse green rubber material from the unvulcanized green tire through and around the chemically treated, RFID equipped mesh label during vulcanization to minimize, prevent microbubble and/or macrobubble formation and/or delamination during tire vulcanization, or to minimize, prevent microbubble and macrobubble formation and/or delamination during tire vulcanization;
the method comprising:
(a) attaching the chemically treated, RFID equipped mesh label on an outer surface of the green tire;
(b) placing the green tire with the chemically treated, RFID equipped mesh label attached thereon into a tire mold;
(c) subjecting the green tire of step (b) to vulcanization conditions;
(d) while vulcanizing the green tire of step (c), passing green rubber material from the green tire through a mesh face layer of the RFID mesh label in a direction towards the mesh backing layer of the RFID mesh label while concurrently migrating the chemically treated, RFID equipped mesh label in an internal direction of the green tire; and
(e) concluding vulcanization thereby forming a vulcanized tire having the chemically treated, RFID equipped mesh label completely embedded and internally positioned within the vulcanized tire that is not visible on an outer surface of the tire such that:
(i) the chemically treated, RFID equipped mesh label is bonded to internal portions of the vulcanized tire,
(ii) the chemically treated, RFID equipped mesh label is bonded to internal portions of the vulcanized tire, and (Gi) the RFID device within the chemically treated, RFID equipped mesh label can be read from a predetermined distance by the RFID reader.

23. The method of claim 22, wherein the RFID mesh label is integrally incorporated on a tire sidewall or a tire bead.

24. A vulcanized green tire comprising:
a chemically treated, RFID equipped mesh label integrally incorporated therein, the chemical treated RFID equipped mesh label comprising:
a mesh face layer configured to be adhered to an outer surface of the vulcanized green tire prior to a vulcanization process;
a mesh backing layer attached to the mesh face layer and adapted to be integrally incorporated in the green tire after subjecting the green tire to the vulcanization process; and
an RFID device affixed between the mesh face and mesh backing layers, the RFID device is configured to provide unique identifier(s) and other information upon being read with an RFID reader during and post tire vulcanization;
wherein:
the mesh face layer and mesh backing layer are configured to homogeneously pass and disperse green rubber material from the unvulcanized green tire through and around the chemically treated, RFID equipped mesh label during the vulcanization process to minimize, prevent microbubble and/or macrobubble formation and/or delamination during tire vulcanization, or to minimize, prevent microbubble and macrobubble formation and/or delamination during tire vulcanization.

\* \* \* \* \*